(12) United States Patent
Lohr et al.

(10) Patent No.: US 8,535,199 B2
(45) Date of Patent: Sep. 17, 2013

(54) INFINITELY VARIABLE TRANSMISSIONS, CONTINUOUSLY VARIABLE TRANSMISSIONS, METHODS, ASSEMBLIES, SUBASSEMBLIES, AND COMPONENTS THEREFOR

(75) Inventors: Charles Lohr, Austin, TX (US); Gregory G Stevenson, Austin, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 308 days.

(21) Appl. No.: 12/995,087

(22) PCT Filed: Jun. 6, 2008

(86) PCT No.: PCT/US2008/066182
§ 371 (c)(1),
(2), (4) Date: Nov. 29, 2010

(87) PCT Pub. No.: WO2009/148461
PCT Pub. Date: Dec. 10, 2009

(65) Prior Publication Data
US 2011/0105274 A1 May 5, 2011

(51) Int. Cl.
*F16H 15/36* (2006.01)
(52) U.S. Cl.
USPC ............................................ 476/38; 74/473.1
(58) Field of Classification Search
USPC .................. 476/36, 37, 38, 47; 74/469, 473.1
See application file for complete search history.

(56) References Cited

U.S. PATENT DOCUMENTS

| | | |
|---|---|---|
| 719,595 A | 2/1903 | Huss |
| 1,121,210 A | 12/1914 | Techel |
| 1,175,677 A | 3/1916 | Barnes |
| 1,207,985 A | 12/1916 | Null et al. |
| 1,380,006 A | 5/1921 | Nielson |
| 1,390,971 A | 9/1921 | Samain |

(Continued)

FOREIGN PATENT DOCUMENTS

| | | |
|---|---|---|
| CH | 118064 | 12/1926 |
| CN | 1157379 A | 8/1997 |

(Continued)

OTHER PUBLICATIONS

Thomassy: An Engineering Approach to Simulating Traction EHL. CVT-Hybrid International Conference Mecc/Maastricht/The Netherlands, Nov. 17-19, 2010, p. 97.

(Continued)

*Primary Examiner* — David M Fenstermacher
(74) *Attorney, Agent, or Firm* — Knobbe Martens Olson & Bear LLP

(57) ABSTRACT

Inventive embodiments are directed to components, subassemblies, systems, and/or methods for continuously and infinitely variable transmissions (IVT). In one embodiment, a variator is adapted to receive a control system that cooperates with a shift nut to actuate a ratio change in an IVT. In another embodiment, a neutral lock-out mechanism is adapted to cooperate with the variator to, among other things, disengage an output shaft from a variator. Various inventive mechanical couplings, such as an output engagement mechanism, are provided to facilitate a change in the ratio of an IVT for maintaining a powered zero operating condition. In one embodiment, the output engagement mechanism selectively couples an output member of the variator to a ratio adjuster of the variator. Embodiments of a ratio adjuster cooperate with other components of the IVT to support operation and/or functionality of the IVT. Among other things, user control interfaces for an IVT are disclosed.

7 Claims, 21 Drawing Sheets

(56) References Cited

U.S. PATENT DOCUMENTS

| | | |
|---|---|---|
| 1,558,222 A | 10/1925 | Beetow |
| 1,629,092 A | 5/1927 | Arter et al. |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,209,254 A | 7/1940 | Ahnger |
| 2,259,933 A | 10/1941 | Holloway |
| 2,325,502 A | 7/1943 | Georges |
| 2,469,653 A * | 5/1949 | Kopp .............................. 476/37 |
| 2,480,968 A | 9/1949 | Ronai |
| 2,596,538 A | 5/1952 | Dicke |
| 2,597,849 A | 5/1952 | Alfredeen |
| 2,675,713 A | 4/1954 | Acker |
| 2,730,904 A | 1/1956 | Rennerfelt |
| 2,748,614 A | 6/1956 | Weisel |
| 2,868,038 A | 1/1959 | Billeter |
| 2,959,070 A | 1/1959 | Flinn |
| 2,873,911 A * | 2/1959 | Perrine ....................... 235/61 C |
| 2,874,592 A | 2/1959 | Oehrli |
| 2,883,883 A | 4/1959 | Chillson |
| 2,913,932 A | 11/1959 | Oehru |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,048,056 A | 8/1962 | Wolfram |
| 3,051,020 A | 8/1962 | Hartupee |
| 3,087,348 A | 4/1963 | Kraus |
| 3,154,957 A * | 11/1964 | Kashihara ....................... 476/38 |
| 3,163,050 A | 12/1964 | Kraus |
| 3,176,542 A | 4/1965 | Monch |
| 3,184,983 A | 5/1965 | Kraus |
| 3,204,476 A * | 9/1965 | Rouverol ....................... 475/159 |
| 3,209,606 A * | 10/1965 | Yamamoto ....................... 476/39 |
| 3,211,364 A | 10/1965 | Wentling et al. |
| 3,216,283 A | 11/1965 | General |
| 3,246,531 A * | 4/1966 | Kashihara ....................... 476/38 |
| 3,248,960 A | 5/1966 | Schottler |
| 3,273,468 A | 9/1966 | Allen |
| 3,280,646 A | 10/1966 | Lemieux |
| 3,292,443 A | 12/1966 | Felix |
| 3,340,895 A | 9/1967 | Osgood, Jr. et al. |
| 3,407,687 A | 10/1968 | Hayashi |
| 3,440,895 A | 4/1969 | Fellows |
| 3,464,281 A | 9/1969 | Azuma et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,996,807 A | 12/1976 | Adams |
| 4,103,514 A | 8/1978 | Grosse-Entrup |
| 4,159,653 A | 7/1979 | Koivunen |
| 4,169,609 A | 10/1979 | Zampedro |
| 4,177,683 A * | 12/1979 | Moses .............................. 476/30 |
| 4,227,712 A | 10/1980 | Dick |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,526,255 A | 7/1985 | Hennessey et al. |
| 4,560,369 A | 12/1985 | Hattori |
| 4,567,781 A * | 2/1986 | Russ .............................. 74/88 |
| 4,574,649 A | 3/1986 | Seol |
| 4,585,429 A | 4/1986 | Marier |
| 4,630,839 A | 12/1986 | Seol |
| 4,700,581 A | 10/1987 | Tibbals, Jr. |
| 4,713,976 A * | 12/1987 | Wilkes ............................. 476/21 |
| 4,717,368 A | 1/1988 | Yamaguchi et al. |
| 4,735,430 A | 4/1988 | Tomkinson |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,033,322 A | 7/1991 | Nakano |
| 5,037,361 A | 8/1991 | Takahashi |
| 5,069,655 A | 12/1991 | Schivelbusch |
| 5,121,654 A | 6/1992 | Fasce |
| 5,125,677 A | 6/1992 | Ogilvie et al. |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A * | 6/1994 | Lutz .............................. 475/214 |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,690,346 A | 11/1997 | Keskitalo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |

| | | |
|---|---|---|
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,066,067 A | 5/2000 | Greenwood |
| 6,071,210 A | 6/2000 | Kato |
| 6,076,846 A | 6/2000 | Clardy |
| 6,079,726 A | 6/2000 | Busby |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidan |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,217,473 B1 | 4/2001 | Ueda et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,178 B1 | 3/2002 | Wittkopp |
| 6,375,412 B1 | 4/2002 | Dial |
| 6,390,946 B1 | 5/2002 | Hibi et al. |
| 6,406,399 B1 | 6/2002 | Ai |
| 6,419,608 B1 | 7/2002 | Miller |
| 6,425,838 B1 | 7/2002 | Matsubara et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,723,016 B2 | 4/2004 | Sumi |
| 6,805,654 B2 | 10/2004 | Nishii |
| 6,849,020 B2 | 2/2005 | Sumi |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,320,660 B2 | 1/2008 | Miller |
| 7,322,901 B2 | 1/2008 | Miller et al. |
| 7,347,801 B2 | 3/2008 | Guenter et al. |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |

| | | |
|---|---|---|
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,107 B2 | 6/2010 | Miller |
| 7,727,108 B2 | 6/2010 | Miller et al. |
| 7,727,115 B2 | 6/2010 | Serkh |
| 7,731,615 B2 | 6/2010 | Miller et al. |
| 7,762,920 B2 | 7/2010 | Smithson et al. |
| 7,785,228 B2 | 8/2010 | Smithson et al. |
| 7,828,685 B2 | 11/2010 | Miller |
| 7,871,353 B2 | 1/2011 | Nichols et al. |
| 7,883,442 B2 | 2/2011 | Miller et al. |
| 7,885,747 B2 | 2/2011 | Miller et al. |
| 7,909,727 B2 | 3/2011 | Smithson et al. |
| 7,914,029 B2 | 3/2011 | Miller et al. |
| 8,142,323 B2 | 3/2012 | Tsuchiya et al. |
| 2001/0008192 A1 | 7/2001 | Morisawa |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0045511 A1 | 4/2002 | Geiberger et al. |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0216216 A1 | 11/2003 | Inoue et al. |
| 2003/0221892 A1 | 12/2003 | Matsumoto et al. |
| 2004/0058772 A1 | 3/2004 | Inoue et al. |
| 2004/0082421 A1 | 4/2004 | Wafzig |
| 2004/0119345 A1 | 6/2004 | Takano |
| 2004/0204283 A1 | 10/2004 | Inoue |
| 2005/0037876 A1 | 2/2005 | Unno et al. |
| 2005/0227809 A1 | 10/2005 | Bitzer et al. |
| 2006/0052204 A1 | 3/2006 | Eckert et al. |
| 2006/0108956 A1 | 5/2006 | Clark |
| 2006/0111212 A9 | 5/2006 | Ai et al. |
| 2006/0180363 A1 | 8/2006 | Uchisasai |
| 2006/0234822 A1 | 10/2006 | Morscheck et al. |
| 2007/0004552 A1 | 1/2007 | Matsudaira et al. |
| 2007/0004556 A1 | 1/2007 | Rohs et al. |
| 2007/0149342 A1 | 6/2007 | Guenter et al. |
| 2007/0155567 A1 | 7/2007 | Miller et al. |
| 2007/0155580 A1 | 7/2007 | Nichols et al. |
| 2008/0032852 A1 | 2/2008 | Smithson et al. |
| 2008/0032854 A1 | 2/2008 | Smithson et al. |
| 2008/0034585 A1 | 2/2008 | Smithson et al. |
| 2008/0039269 A1 | 2/2008 | Smithson et al. |
| 2008/0039271 A1 | 2/2008 | Smithson et al. |
| 2008/0039272 A1 | 2/2008 | Smithson et al. |
| 2008/0039273 A1 | 2/2008 | Smithson et al. |
| 2008/0039274 A1 | 2/2008 | Smithson et al. |
| 2008/0039275 A1 | 2/2008 | Smithson et al. |
| 2008/0039276 A1 | 2/2008 | Smithson et al. |
| 2008/0039277 A1 | 2/2008 | Smithson et al. |
| 2008/0040008 A1 | 2/2008 | Smithson et al. |
| 2008/0081728 A1 | 4/2008 | Faulring et al. |
| 2008/0121487 A1 | 5/2008 | Miller et al. |
| 2008/0139363 A1 | 6/2008 | Williams |
| 2008/0141809 A1 | 6/2008 | Miller et al. |
| 2008/0161151 A1 | 7/2008 | Miller |
| 2008/0200300 A1 | 8/2008 | Smithson et al. |
| 2008/0236319 A1 | 10/2008 | Nichols et al. |
| 2008/0261771 A1 | 10/2008 | Nichols et al. |
| 2008/0305920 A1 | 12/2008 | Nishii et al. |
| 2009/0107454 A1 | 4/2009 | Hiyoshi et al. |
| 2009/0164076 A1 | 6/2009 | Vasiliotis et al. |
| 2009/0280949 A1 | 11/2009 | Lohr |
| 2009/0312145 A1 | 12/2009 | Pohl et al. |
| 2010/0056322 A1 | 3/2010 | Thomassy |
| 2010/0093479 A1 | 4/2010 | Carter et al. |
| 2010/0093480 A1 | 4/2010 | Pohl et al. |
| 2010/0093485 A1 | 4/2010 | Pohl et al. |
| 2010/0131164 A1 | 5/2010 | Carter et al. |
| 2010/0264620 A1 | 10/2010 | Miles et al. |
| 2010/0267510 A1 | 10/2010 | Nichols et al. |
| 2011/0088503 A1 | 4/2011 | Armstrong et al. |
| 2011/0127096 A1 | 6/2011 | Schneidewind |
| 2011/0172050 A1 | 7/2011 | Nichols et al. |
| 2011/0218072 A1 | 9/2011 | Lohr et al. |
| 2011/0230297 A1 | 9/2011 | Shiina et al. |
| 2011/0319222 A1 | 12/2011 | Ogawa et al. |
| 2012/0035016 A1 | 2/2012 | Miller et al. |
| 2012/0043841 A1 | 2/2012 | Miller |
| 2012/0238386 A1 | 9/2012 | Pohl et al. |
| 2012/0258839 A1 | 10/2012 | Smithson et al. |
| 2012/0309579 A1 | 12/2012 | Miller et al. |

FOREIGN PATENT DOCUMENTS

| | | |
|---|---|---|
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 | 5/2000 |
| DE | 10155372 A1 | 5/2003 |
| EP | 0 432 742 | 12/1990 |
| EP | 0528382 | 2/1993 |
| EP | 635639 A1 | 1/1995 |
| EP | 0638741 | 2/1995 |
| EP | 0976956 | 2/2000 |
| EP | 1136724 | 9/2001 |
| EP | 1366978 | 3/2003 |
| EP | 1811202 A1 | 7/2007 |
| FR | 620375 | 4/1927 |
| FR | 2590638 | 5/1987 |
| GB | 391448 | 4/1933 |
| GB | 592320 | 9/1947 |
| GB | 906 002 A | 9/1962 |
| GB | 919430 A | 2/1963 |
| GB | 1132473 | 11/1968 |
| GB | 1165545 | 10/1969 |
| GB | 1 376 057 | 12/1974 |
| GB | 2031822 | 4/1980 |
| GB | 2 035 482 | 6/1980 |
| GB | 2 080 452 | 8/1982 |
| JP | 42-2843 | 2/1942 |
| JP | 44-1098 | 1/1944 |
| JP | 42-2844 | 2/1967 |
| JP | 47-29762 | 11/1972 |
| JP | 48-54371 | 7/1973 |
| JP | 49-12742 | 3/1974 |
| JP | 50-114581 | 9/1975 |
| JP | 51-25903 | 8/1976 |
| JP | 51-150380 | 12/1976 |
| JP | 47-20535 | 8/1977 |
| JP | 53 048166 | 1/1978 |
| JP | 55-135259 | 4/1979 |
| JP | 58065361 | 4/1983 |
| JP | 59069565 | 4/1984 |
| JP | 60-247011 | 12/1985 |
| JP | 61-144466 | 7/1986 |
| JP | 61-173722 | 10/1986 |
| JP | 63-219953 | 9/1988 |
| JP | 63219953 | 9/1988 |
| JP | 63-160465 | 10/1988 |
| JP | 02157483 | 6/1990 |
| JP | 02271142 | 6/1990 |
| JP | 04-166619 | 6/1992 |
| JP | 04-272553 | 9/1992 |
| JP | 52-35481 | 9/1993 |
| JP | 7-42799 | 2/1995 |
| JP | 7-139600 | 5/1995 |
| JP | 08170706 A | 7/1996 |
| JP | 09024743 A | 1/1997 |
| JP | 09-089064 | 3/1997 |
| JP | 411063130 | 3/1999 |
| JP | 2000-46135 | 2/2000 |
| JP | 2001-27298 | 1/2001 |
| JP | 2001521109 A | 11/2001 |
| JP | 2002-147558 | 5/2002 |
| JP | 2002-250421 | 6/2002 |
| JP | 2003-028257 | 1/2003 |
| JP | 2003-56662 | 2/2003 |

| | | |
|---|---|---|
| JP | 2003-524119 | 8/2003 |
| JP | 2003-336732 | 11/2003 |
| JP | 2004162652 A | 6/2004 |
| JP | 8-247245 | 9/2004 |
| JP | 2005/240928 A | 9/2005 |
| JP | 2006015025 | 1/2006 |
| JP | 2007-535715 | 12/2007 |
| JP | 2008-002687 | 1/2008 |
| JP | 03-149442 | 1/2009 |
| JP | 2010069005 | 4/2010 |
| NE | 98467 | 7/1961 |
| TW | 582363 | 4/2004 |
| TW | 590955 | 6/2004 |
| WO | WO 01/73319 | 10/2001 |
| WO | WO 03100294 | 12/2003 |
| WO | WO 2005/083305 | 9/2005 |
| WO | WO2010/017242 | 2/2010 |
| WO | WO 2011/101991 | 8/2011 |

OTHER PUBLICATIONS

International Search Report and Written Opinion for PCT Application No. PCT/US2008/066182 dated Dec. 9, 2008.

Office Action dated Nov. 26, 2012 for Chinese Patent Application No. 200880130428.0.

\* cited by examiner

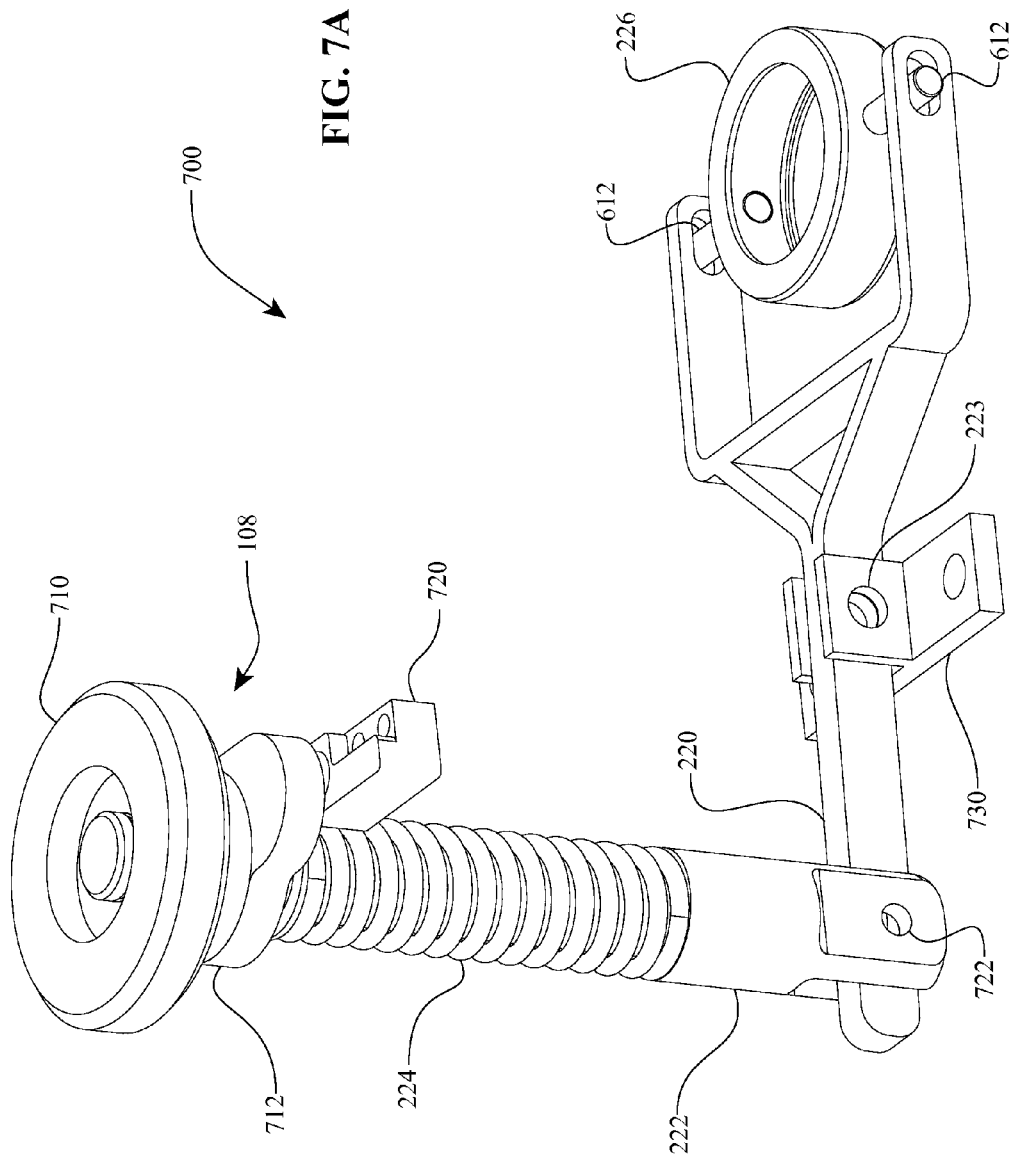

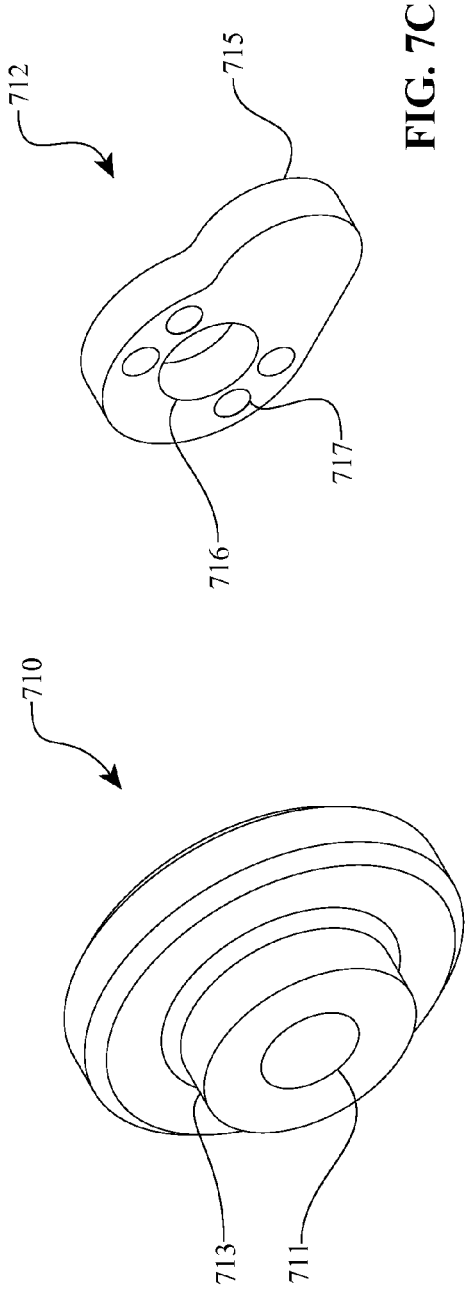
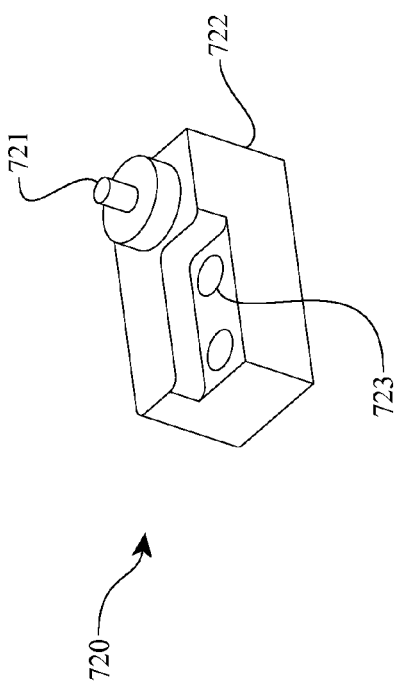
FIG. 7C
FIG. 7D
FIG. 7B

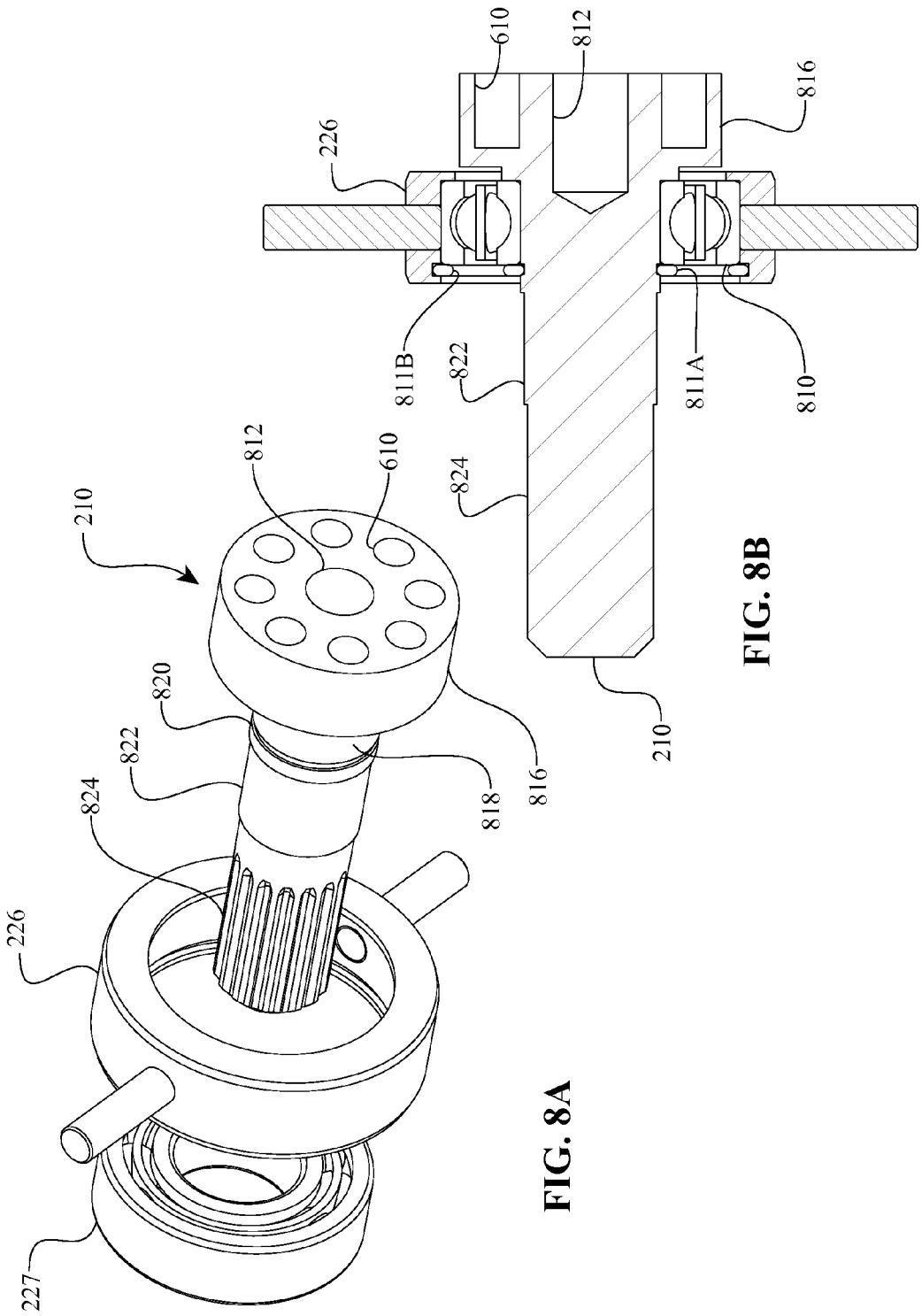

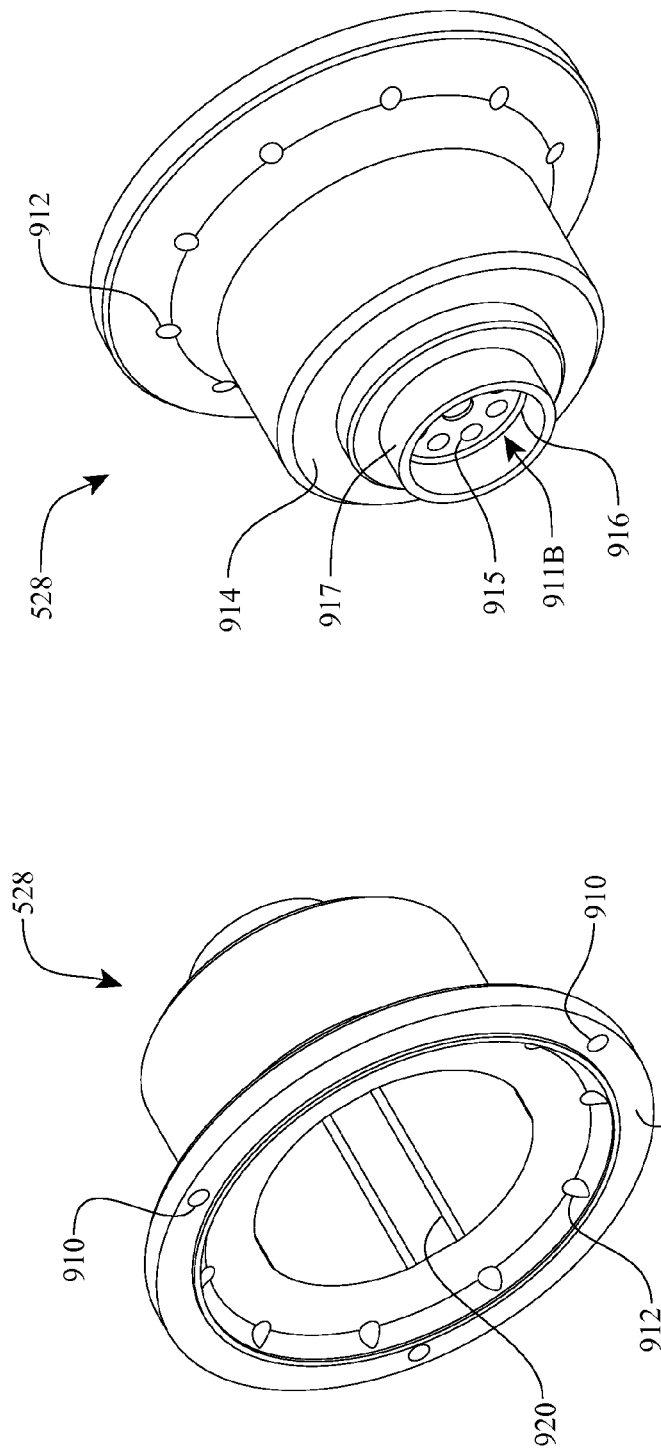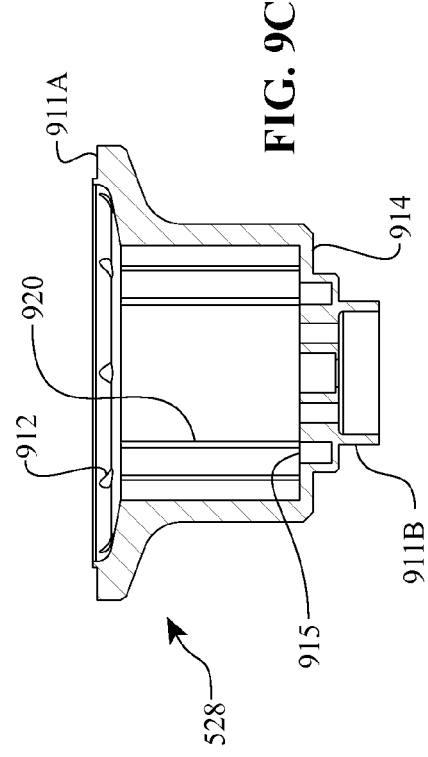

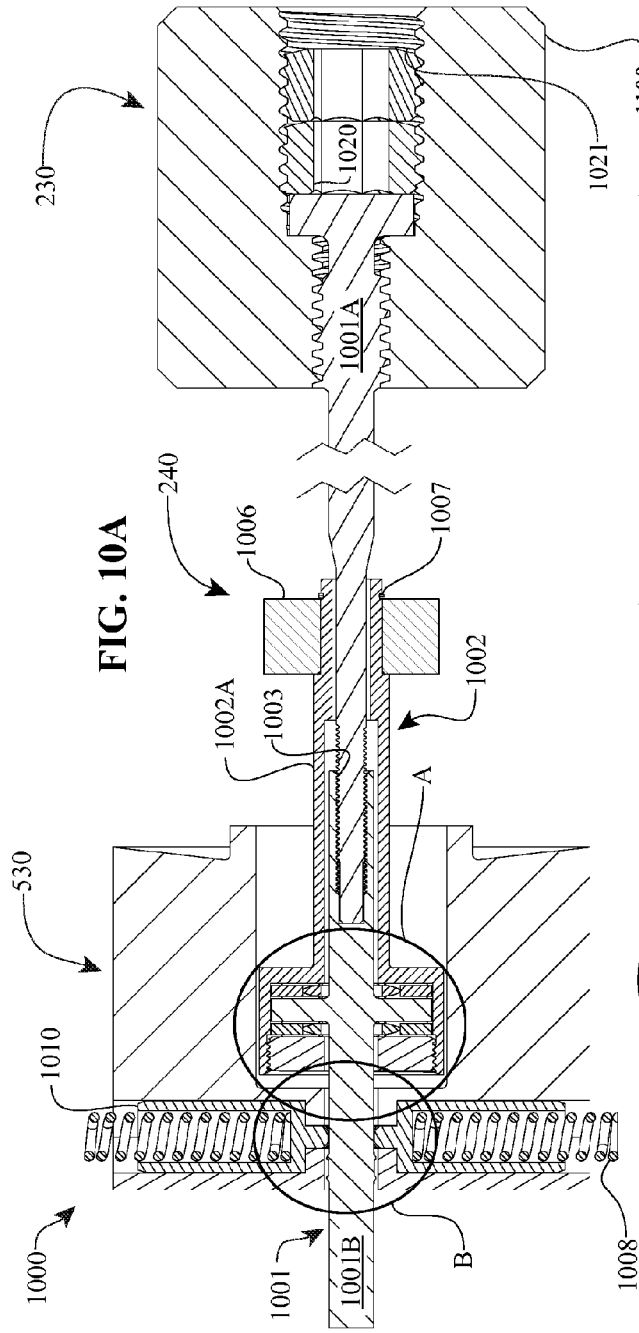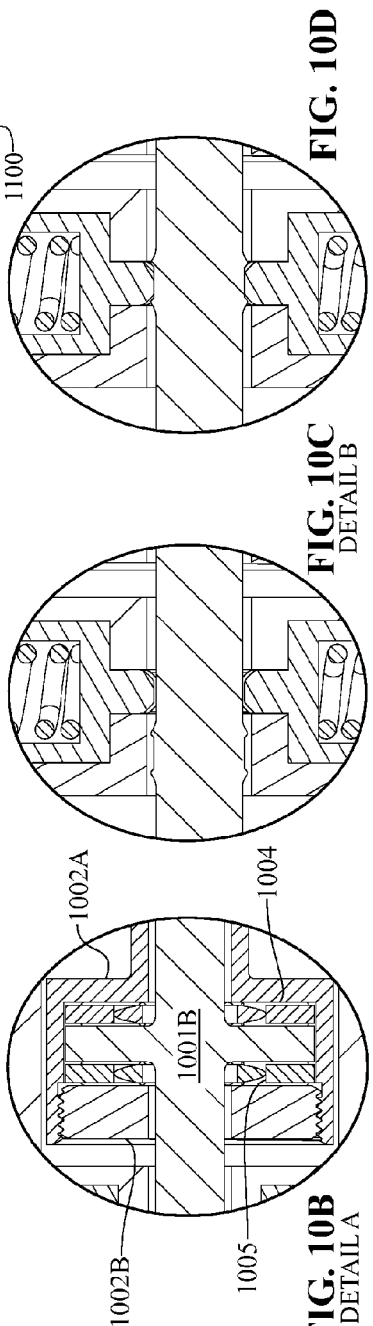

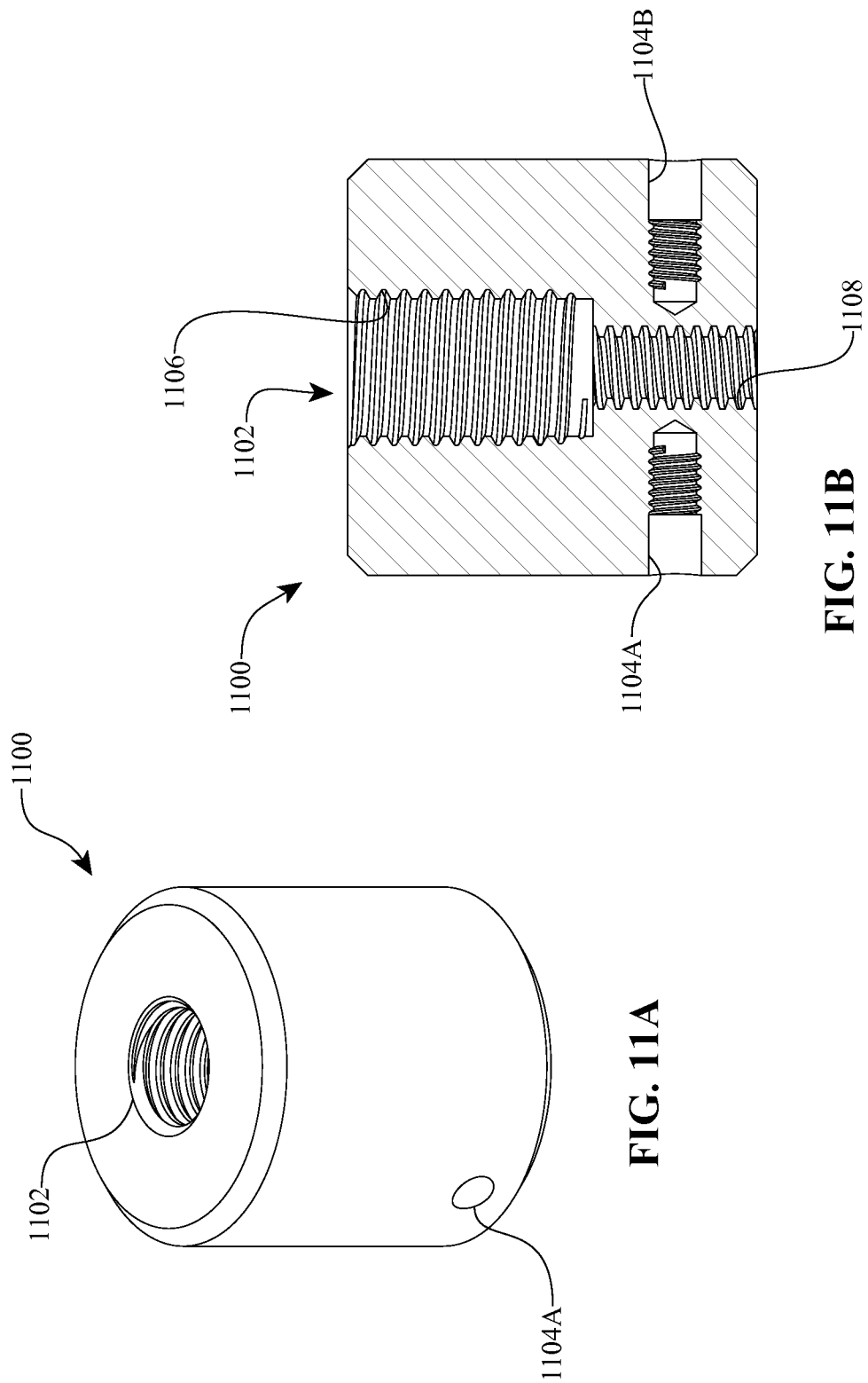

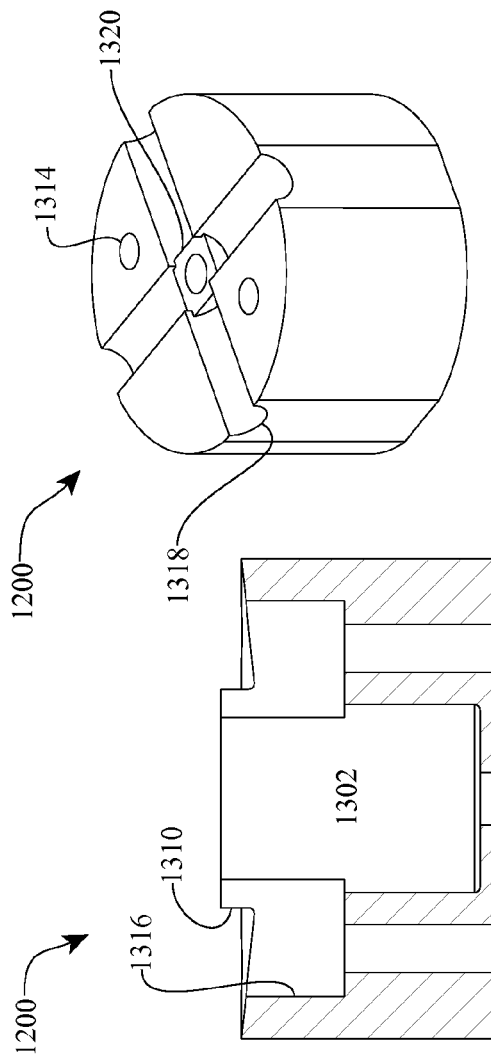
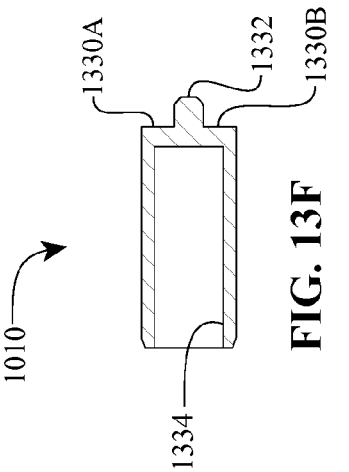
FIG. 13C
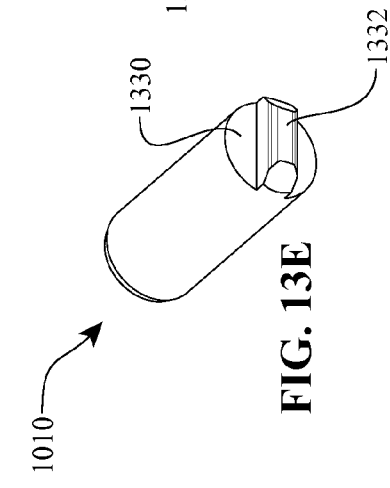
FIG. 13F
FIG. 13B
FIG. 13E
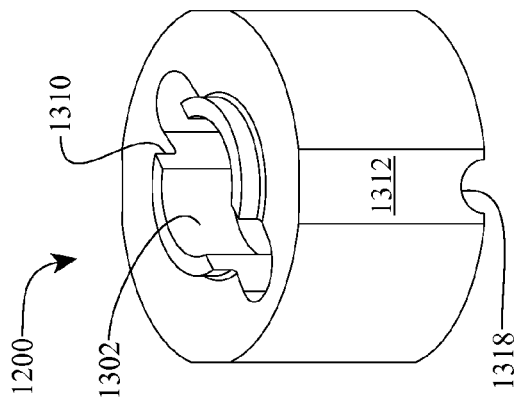
FIG. 13A
FIG. 13D

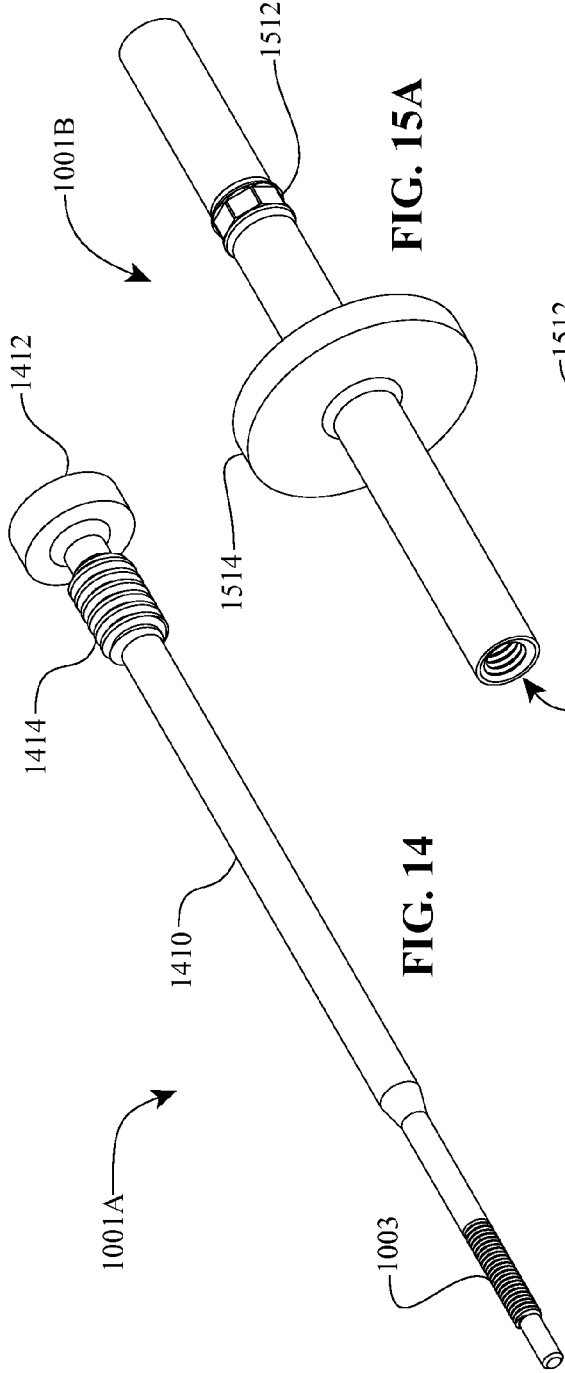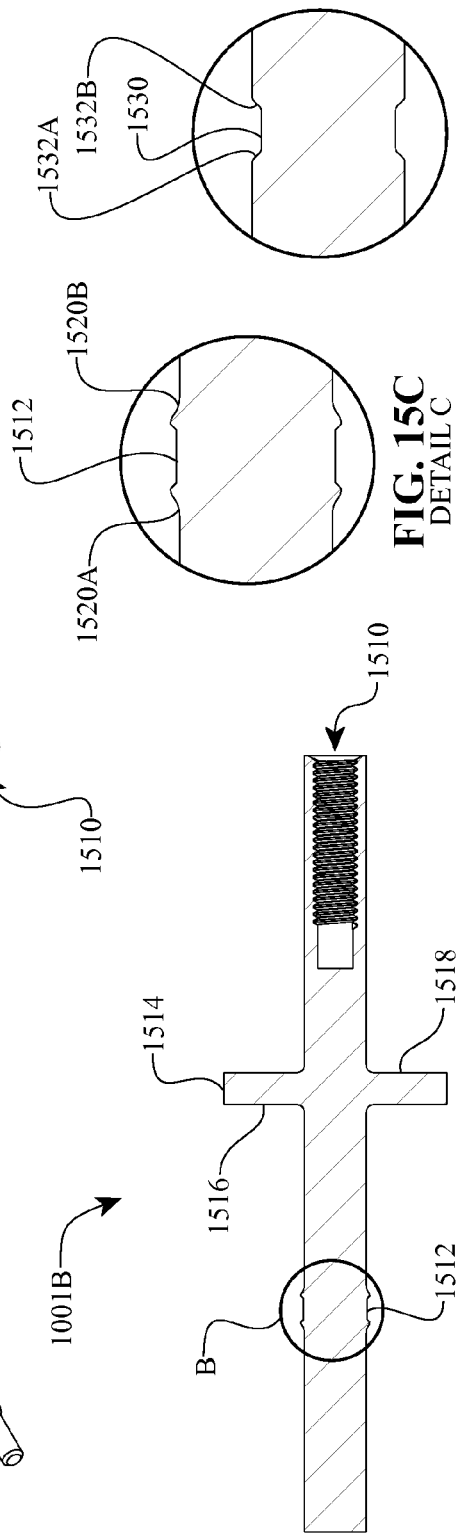

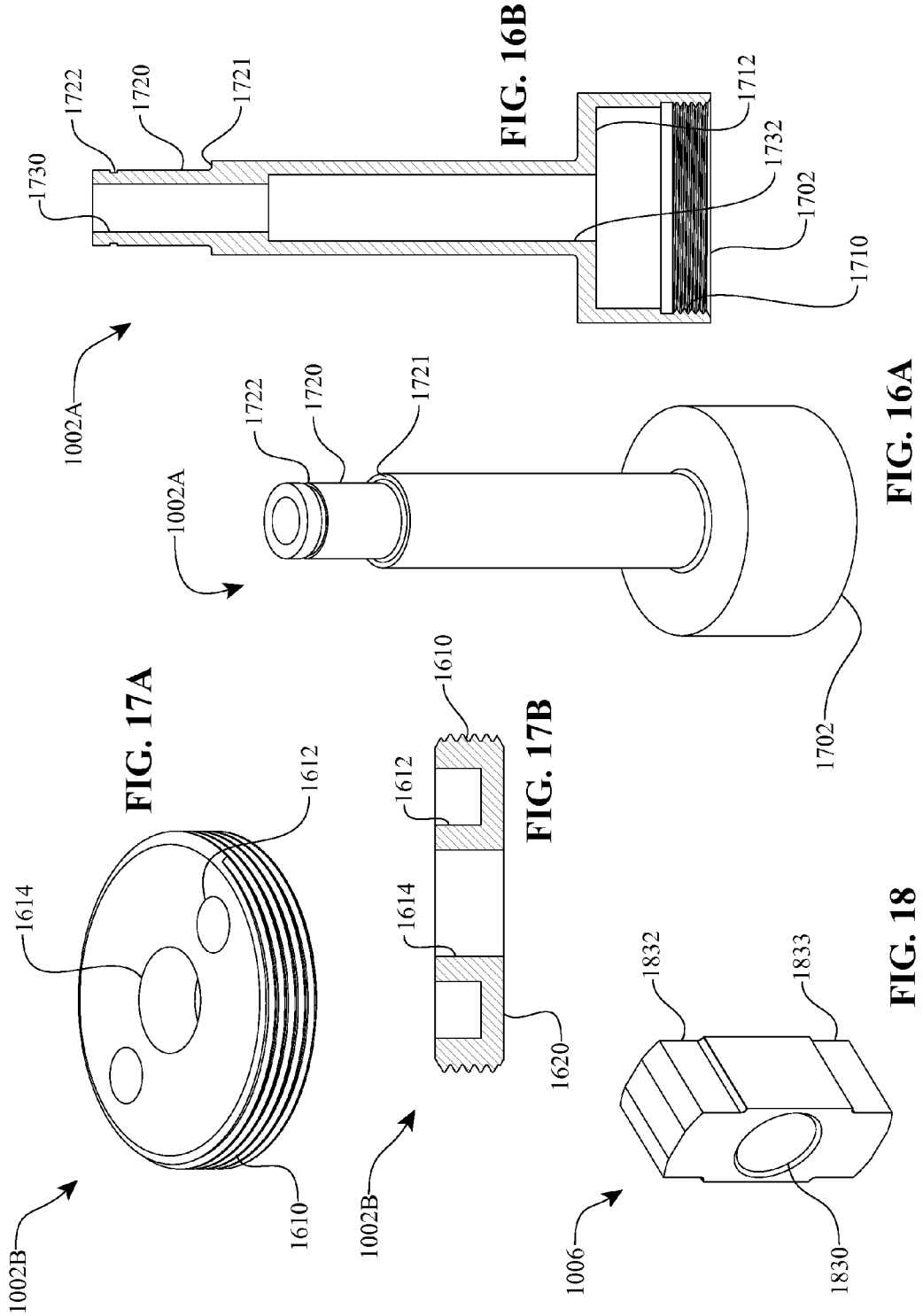

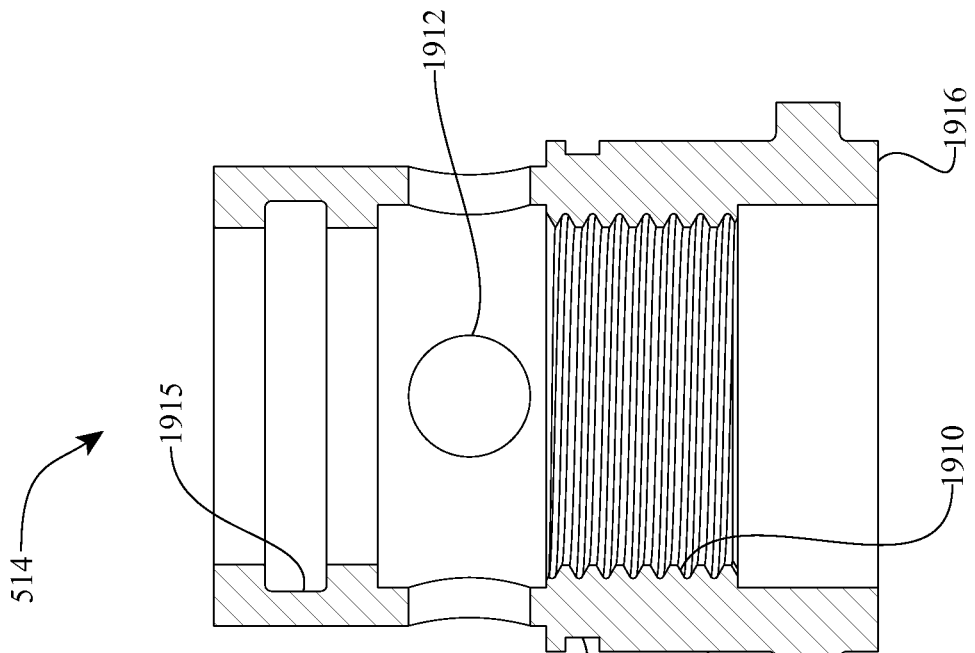
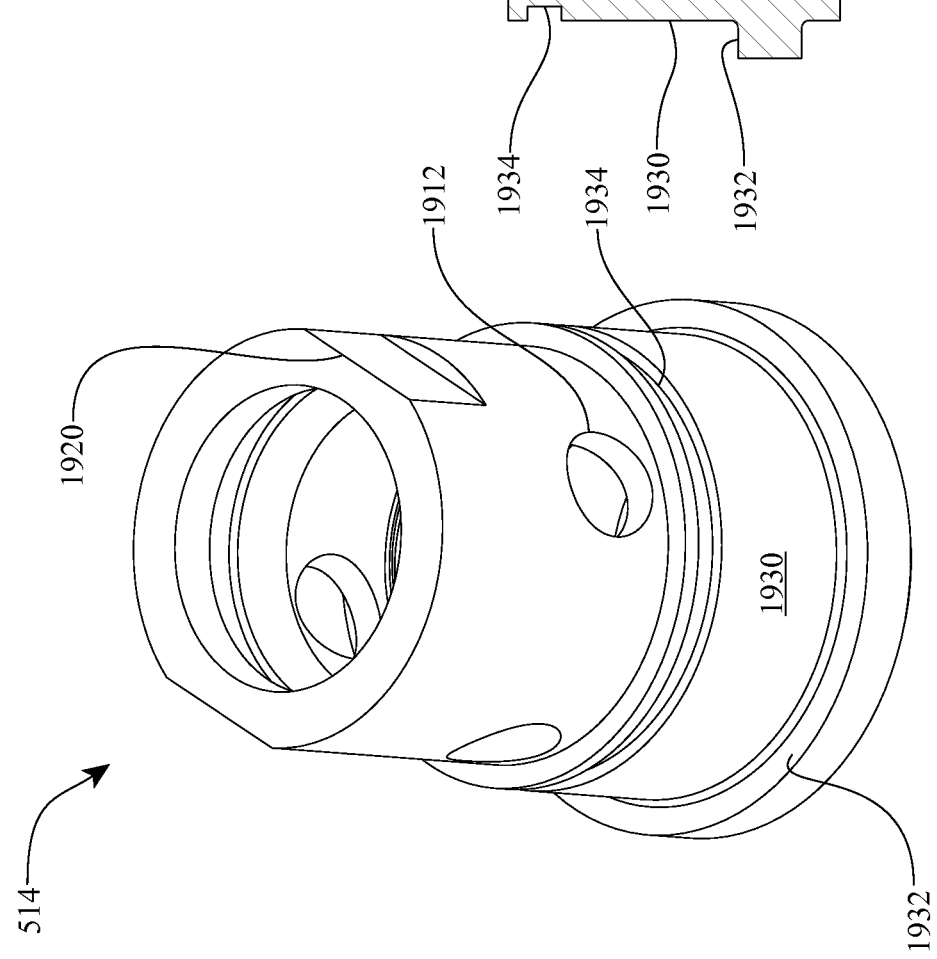
FIG. 19B
FIG. 19A

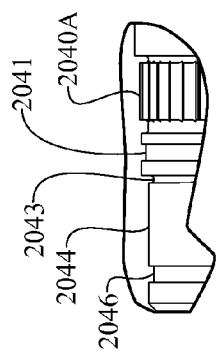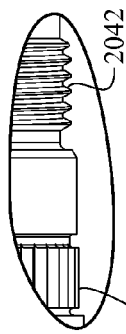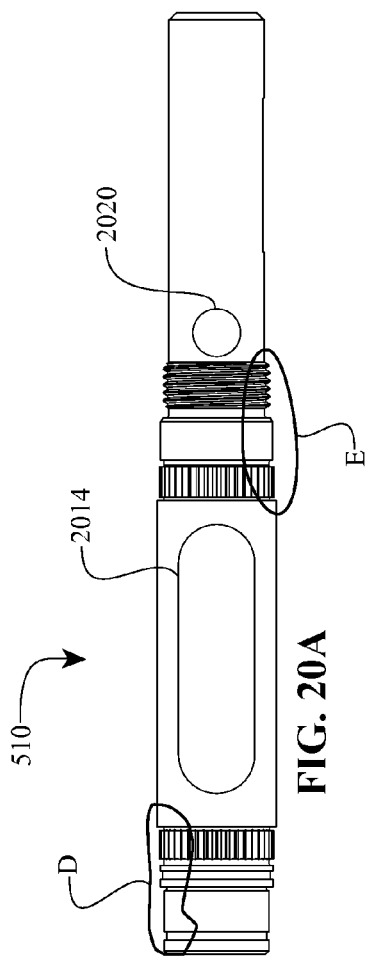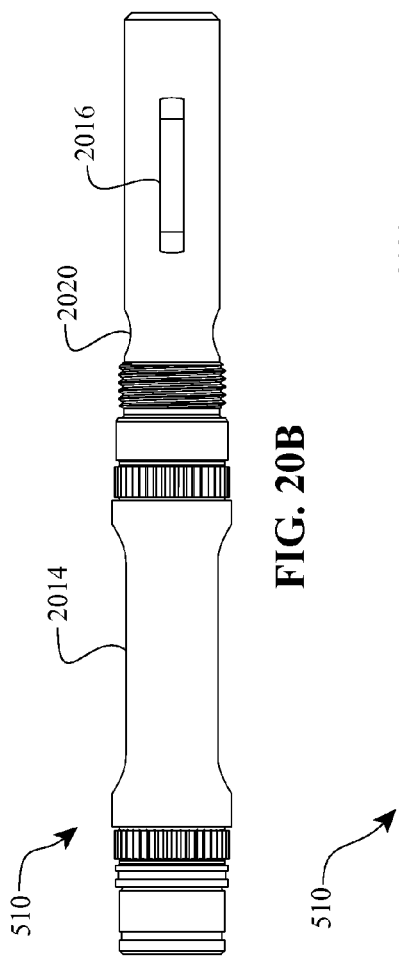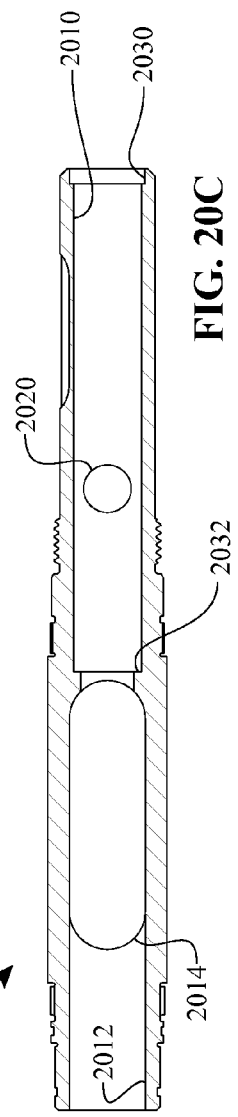

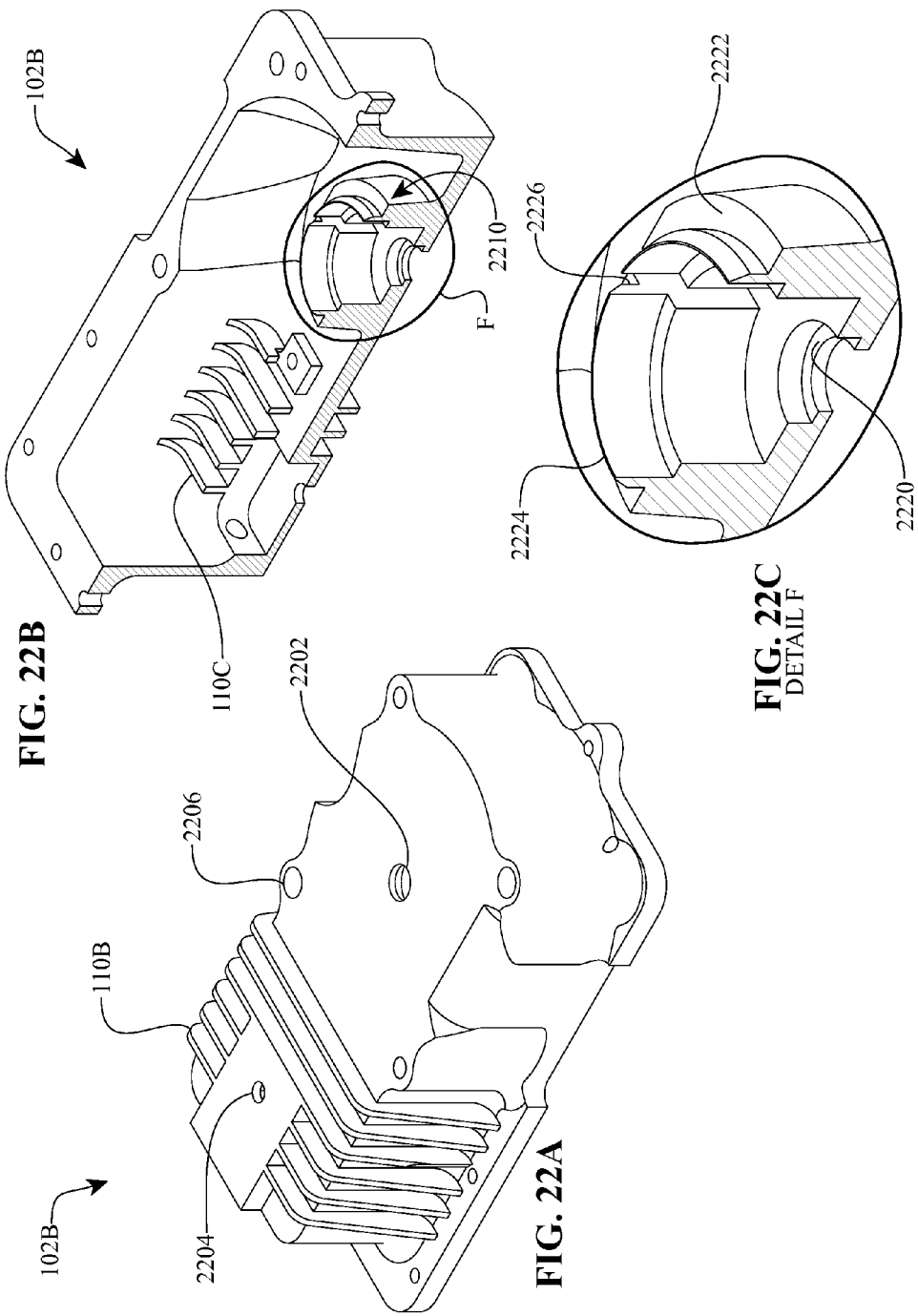

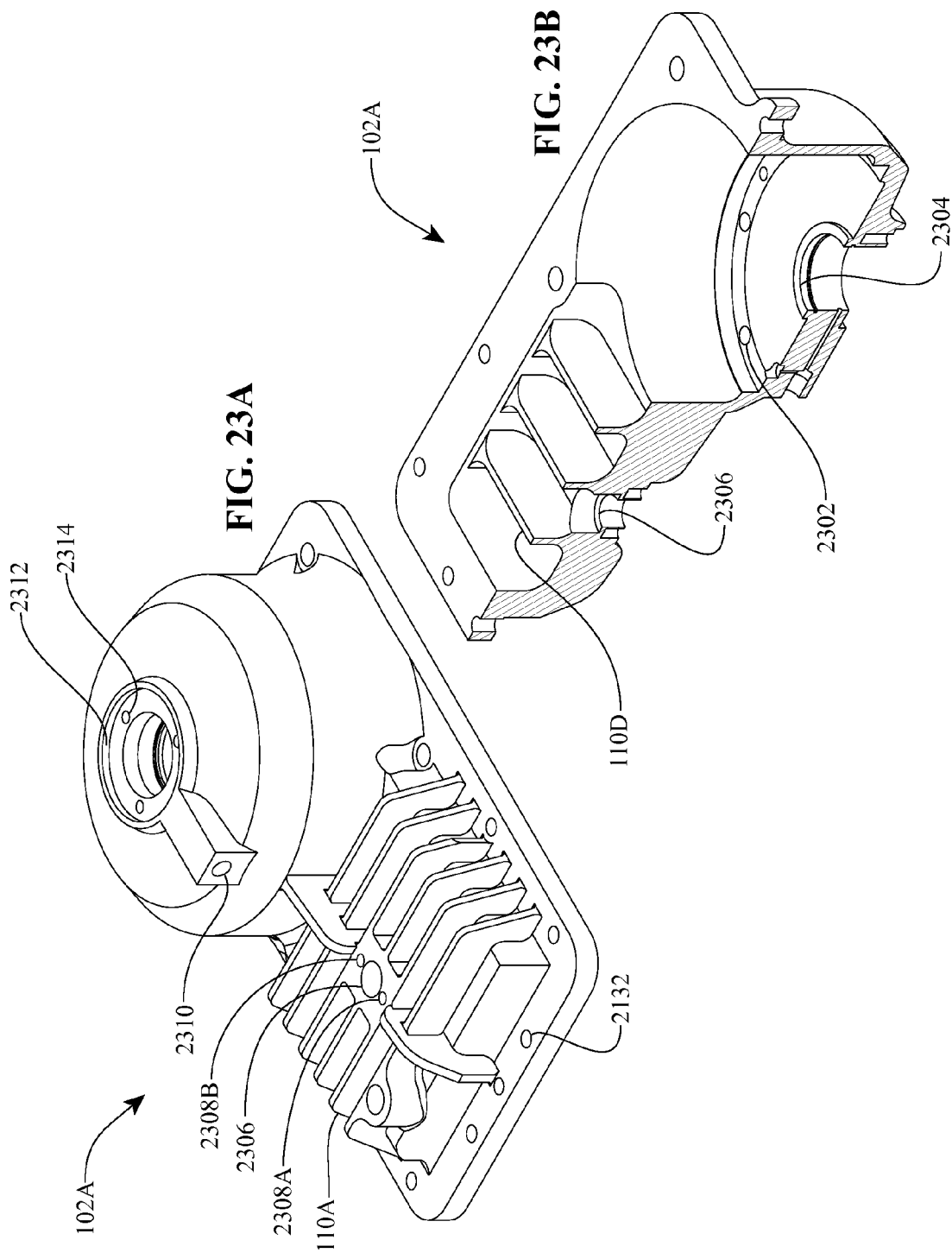

INFINITELY VARIABLE TRANSMISSIONS, CONTINUOUSLY VARIABLE TRANSMISSIONS, METHODS, ASSEMBLIES, SUBASSEMBLIES, AND COMPONENTS THEREFOR

This application is the National Stage of International Application No. PCT/US2008/066182, filed on Jun. 6, 2008, entitled INFINITELY VARIABLE TRANSMISSIONS, CONTINUOUSLY VARIABLE TRANSMISSIONS, METHODS, ASSEMBLIES, SUBASSEMBLIES, AND COMPONENTS THEREFOR, which is incorporated by reference herein in its entirety.

BACKGROUND OF THE INVENTION

1. Field of the Invention

The field of the invention relates generally to transmissions, and more particularly the inventive embodiments related to continuously variable transmissions (CVTs) and infinitely variable transmissions (IVTs).

2. Description of the Related Art

In certain systems, power is characterized by torque and rotational speed. More specifically, power in these systems is generally defined as the product of torque and rotational speed. Typically, a transmission couples to a power input that provides an input torque at an input speed. The transmission also couples to a load that demands an output torque and output speed, which may differ from the input torque and the input speed. Typically, and generalizing, a prime mover provides the power input to the transmission, and a driven device or load receives the power output from the transmission. A primary function of the transmission is to modulate the power input in such a way to deliver a power output to the driven device at a desired ratio of input speed to output speed ("speed ratio").

Some mechanical drives include transmissions of the type known as stepped, discrete, or fixed ratio. These transmissions are configured to provide speed ratios that are discrete or stepped in a given speed ratio range. For example, such a transmission may provide for a speed ratio of 1:2, 1:1, or 2:1, but such a transmission cannot deliver intermediate speed ratios such as 1:1.5, 1:1.75, 1.5:1, or 1.75:1, for example. Other drives include a type of transmission generally known as a continuously variable transmission (or "CVT"), which includes a continuously variable variator. A CVT, in contrast to a stepped transmission, is configured to provide every fractional ratio in a given speed ratio range. For example, in the speed ratio range mentioned above, a CVT is generally capable of delivering any desired speed ratio between 1:2 and 2:1, which would include speed ratios such as 1:1.9, 1:1.1, 1.3:1, 1.7:1, etc. Yet other drives employ an infinitely variable transmission (or "IVT"). An IVT, like a CVT, is capable of producing every speed ratio in a given ratio range. However, in contrast to a CVT, the IVT is configured to deliver a zero output speed (a "powered zero" state) with a steady input speed. Hence, given the definition of speed ratio as the ratio of input speed to output speed, the IVT is capable of delivering an infinite set of speed ratios, and consequently, the IVT is not limited to a given ratio range. It should be noted that some transmissions use a continuously variable variator coupled to other gearing and/or clutches in a split powered arrangement to produce IVT functionality. However, as used here, the term IVT is primarily understood as comprehending an infinitely variable variator which produces IVT functionality without being necessarily coupled to additional gearing and/or clutches.

The field of mechanical power transmission is cognizant of continuous or infinitely variable variators of several types. For example, one well known class of continuous variators is the belt-and-variable-radius-pulley variator. Other known variators include hydrostatic, toroidal, and cone-and-ring variators. In some cases, these variators couple to other gearing to provide IVT functionality. Some hydromechanical variators can provide infinite ratio variability without additional gearing. Some variators, continuously and/or infinitely variable, are classified as frictional or traction variators because they rely on dry friction or elastohydrodynamic traction, respectively, to transfer torque across the variator. One example of a traction variator is a ball variator in which spherical elements are clamped between torque transfer elements and a thin layer of elastohydrodynamic fluid serves as the torque transfer conduit between the spherical and the torque transfer elements. It is to this latter class of variators that the inventive embodiments disclosed here are most related.

There is a continuing need in the CVT/IVT industry for transmission and variator improvements in increasing efficiency and packaging flexibility, simplifying operation, and reducing cost, size, and complexity, among other things. The inventive embodiments of the CVT and/or IVT methods, systems, subassemblies, components, etc., disclosed below address some or all of the aspects of this need.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Inventive Embodiments" one will understand how the features of the system and methods provide several advantages over traditional systems and methods.

One aspect of the invention relates to a ball planetary infinitely variable transmission (IVT) having a shift rod driver and an output feedback rod. The output feedback rod is coupled to the shift rod driver. In one embodiment, the IVT includes a set of engagement pins that are configured to selectively couple to the output feedback rod.

Another aspect of the invention concerns a ball planetary infinitely variable transmission (IVT) having a throw-out bearing housing that is coupled to an output member of the IVT. The IVT can include a neutral fork arm that has a first end and a second end. The first end of the neutral fork arm is coupled to the throw-out bearing housing. In one embodiment, the IVT has a clevis member coupled to the second end of the neutral fork arm. The IVT can also include a knob coupled to the clevis member. The knob can be configured to be accessible from the exterior of the IVT.

Yet another aspect of the invention involves a variator for an infinitely variable transmission (IVT). The variator can include a group of power roller assemblies that are arranged angularly about a longitudinal axis of the transmission. The power roller assemblies are configured to tilt in operation. The variator can have a first traction ring in contact with the power rollers. The first traction ring is substantially non-rotatable. In one embodiment, the variator has a second traction ring in contact with the power rollers. The variator can also include a carrier that is adapted to transfer an input power to the power roller assemblies. In one embodiment, the variator has an output member operably coupled to the second traction ring. The output member is adapted to translate along the longitudinal axis. The output member is also configured to engage and disengage selectively from the second traction ring.

One aspect of the invention concerns a transmission having a group of power roller assemblies. The power roller assemblies are arranged angularly about a longitudinal axis of the transmission. The power roller assemblies are configured to tilt during operation. In one embodiment, the transmission can have a first traction ring in contact with the power rollers. The transmission can include a second traction ring in contact with the power rollers. In one embodiment, the transmission has an idler in contact with the power rollers. The idler is adapted to translate with respect to the longitudinal axis. The transmission also has a shift rod sleeve operably coupled to the idler. The shift rod sleeve is configured to rotate with the idler. In some embodiments, the transmission has a shift rod driver arranged along the longitudinal axis. The shift rod driver is operably coupled to the shift rod sleeve. The transmission can include an output feedback rod coupled to the shift rod driver. The transmission can also include an output engagement mechanism operably coupled to the output feedback rod. The output engagement mechanism is configured to rotate with the second traction ring.

Another aspect of the invention relates to a neutral lock-out mechanism for a transmission. The neutral lock-out mechanism has a throw-out bearing housing operably coupled to an output member of the transmission. In one embodiment, the neutral lock-out mechanism has a neutral fork arm having a first end and a second end. The first end is coupled to the throw-out bearing housing. The neutral lock-out mechanism can have a clevis member coupled to the second end. The neutral lock-out mechanism can also have a knob coupled to the clevis member. The knob can be configured to be accessible from the exterior of the transmission.

Yet one more aspect of the invention addresses an output shaft assembly for a transmission. The output shaft assembly has an output shaft that has a flange end and a splined end. The output shaft adapted to translate axially. In one embodiment, the output shaft has a throw-out bearing housing operably coupled to the output shaft. In some embodiments, an axial translation of the throw-out bearing corresponds to an axial translation of the output shaft.

In another aspect, the invention concerns a control system for an infinitely variable transmission (IVT). The control system has a shift rod driver and an output feedback rod coupled to the shift rod driver. In one embodiment, the control system has a control interface housing operably coupled to the shift rod driver. The control interface housing is configured to translate axially. The control system can also have an output member configured to be selectively coupled to the output feedback rod.

Another aspect of the invention relates to a method of controlling an infinitely variable transmission (IVT). In one embodiment, the method includes providing a ratio adjuster coupled to the IVT. The ratio adjuster is configured to actuate a change in transmission ratio of the IVT. The ratio adjuster has a shift rod driver and an output feedback rod coupled to the shift rod driver. The ratio adjuster also has a shift rod sleeve operably coupled to the output feedback rod. In one embodiment, the method includes sensing a position of the ratio adjuster of the IVT. The position corresponds to a desired transmission output speed of zero. The method can include coupling operably an output member of the IVT to the ratio adjuster. The method can also include actuating the ratio adjuster to maintain a zero output speed of the IVT.

One aspect of the invention relates to a method of controlling an infinitely variable transmission (IVT) having a ratio adjuster and a ball planetary variator. The method includes commanding an IVT output speed of zero. In one embodiment, the method includes sensing the IVT output speed via a mechanical coupling. The mechanical coupling can be configured to couple to both the ratio adjuster and the variator. The method can also include adjusting the mechanical coupling to maintain the IVT output speed at zero.

Another aspect of the invention addresses a ratio adjuster for an infinitely variable transmission (IVT) having a variator. The ratio adjuster has a shift rod driver and an output feedback rod coupled to the shift rod driver. In one embodiment, the ratio adjuster has a shift rod sleeve operably coupled to the output feedback rod. The shift rod sleeve is arranged radially outward of, and coaxially with, the output feedback rod. The shift rod sleeve is coupled to the variator.

One more aspect of the invention concerns a control interface apparatus for a control system having a shift rod driver and a user interface. The control interface apparatus includes a housing having a central bore and an adjustment member coupled to the central bore. In one embodiment, the control interface apparatus includes a first threaded portion located on the central bore. The first threaded portion adapted to receive a threaded portion of the shift rod driver. The control interface apparatus also includes a second threaded portion on the central bore. The second threaded portion is adapted to receive the adjustment member.

Yet another aspect of the invention involves an output engagement mechanism for an infinitely variable transmission (IVT). The output engagement mechanism has a housing and an output member operably coupled to the IVT. The output member is operably coupled to the housing. The output engagement mechanism can include an output feedback rod selectively coupled to the housing. The output feedback rod operably couples to the housing at an output speed of the IVT substantially equal to zero. In one embodiment, the output engagement mechanism includes a group of engagement pins operably coupled to the housing. The engagement pins are arranged angularly about, and extending radially from, a longitudinal axis of the output feedback rod. The output engagement mechanism also includes a groups of springs operably coupled to the engagement pins.

Another aspect of the invention relates to a housing assembly for an output engagement mechanism having a first generally cylindrical housing. The first generally cylindrical housing has a first central bore, a first end, and a second end. The housing assembly includes a set of flat surfaces formed on an exterior perimeter of the cylindrical housing. The housing assembly also includes a first set of channels formed on the first end. The channels extend radially outward from the central bore. In one embodiment, the housing assembly includes a retaining cap coupled to the first end of the cylindrical housing. The retaining cap has a second set of channels configured to substantially align with the first set of channels.

Yet one more aspect of the invention addresses a shift rod driver having a substantially cylindrical rod having a first end and a second end. The shift rod driver has a reaction flange configured on the first end and a first threaded portion formed on the second end. The shift rod driver also has a second threaded portion formed on the first end.

Another aspect of the invention relates to a shift rod member having a substantially cylindrical body with a first end and a second end. The first end has a threaded bore. The shift rod member has a set of engagement surfaces formed on the outer periphery of the cylindrical body. The engagement surfaces can be located in proximity to the second end. The shift rod member also has a bearing flange formed on the outer periphery of the cylindrical body. The bearing flange can be located between the threaded bore and the engagement surfaces.

Yet another aspect of the invention involves a shift rod sleeve for a control system of an infinitely variable transmission (IVT). The shift rod sleeve has a substantially cylindrical body having a first central bore and a second central bore. The first central bore is arranged on a first end of the cylindrical body, and the second central bore is arranged on a second end of the cylindrical body. The first central bore has a different diameter than the second central bore. The shift rod sleeve also has an end cup extending from the second end of the cylindrical body. The end cup can be configured to couple to an output engagement rod of the control system. The end cup has a cup threaded portion. The shift rod sleeve also has a reaction face formed on an interior surface of the end cup.

In another aspect, the invention concerns a carrier nut for an infinitely variable transmission (IVT). The carrier nut has a substantially cylindrical body having a central bore formed with a threaded portion. The threaded portion configured to couple to a main shaft of the IVT. The carrier nut has a first reaction surface formed on a face of one end of the cylindrical body. The carrier nut can have a second reaction surface formed on the outer periphery of the cylindrical body. The carrier nut can also have a shoulder configured on the outer circumference of the cylindrical body. The shoulder adapted to support a bearing of the IVT.

Another aspect of the invention relates to a housing for a transmission. The housing can have an upper housing member with a flange surface having a first group of fastening holes. The housing includes a first set of cooling fins extending outwardly and inwardly from a main cavity of the upper housing member. In one embodiment, the housing includes a piloting shoulder adapted to align and support a control mechanism of the transmission. The housing also includes an intermediate plate coupled to the upper housing member. In one embodiment, the housing includes a lower housing member having a flange surface with a second group of fastening holes. The flange surface configured to couple to the intermediate plate. The lower housing member can also include a second group of cooling fins extending outwardly and inwardly from a main cavity of the lower housing member. The lower housing member can also include a support hub located on the interior of the main cavity of the lower housing member. The support hub has a number of grooves and shoulders.

BRIEF DESCRIPTION OF THE FIGURES

FIG. 7A is a perspective view of certain components a neutral lock-out device that can be used with the transmission of FIG. 1.

FIG. 7B is a perspective view of an exemplary manual neutral knob that can be used with the neutral lock-out device of FIG. 7A.

FIG. 7C is a perspective view of an exemplary switch cam that can be used with the neutral lock-out device of FIG. 7A.

FIG. 7D is a perspective view of an exemplary switch that can be used with the neutral lock-out device of FIG. 7A.

FIG. 8A is a perspective view of certain components of an output shaft assembly that can be used in the transmission of FIG. 1.

FIG. 8B is a cross-sectional view of the output shaft assembly of FIG. 8A.

FIG. 9A is a perspective view of an output coupling that can be used with the IVT of FIG. 5.

FIG. 9B is a perspective view of the output coupling of FIG. 9A.

FIG. 9C is a cross-sectional view of the output coupling of FIG. 9A.

FIG. 10A is a cross-sectional view of certain components of a control system that can be used with the IVT of FIG. 5.

FIG. 10B is a Detail A view of the control system of FIG. 10A.

FIG. 10C is a Detail B view of the control system of FIG. 10A.

FIG. 10D is a cross-sectional view of certain components of the control system of FIG. 10A.

FIG. 11A is a perspective view of an exemplary control interface mechanism housing that can be used with the control system of FIG. 10A.

FIG. 11B is a cross-sectional view of the control interface mechanism housing of FIG. 11A.

FIG. 13A is a perspective view of an output engagement mechanism housing that can be used with the output engagement mechanism of FIG. 12A.

FIG. 13B is a cross-sectional view of the output engagement mechanism housing of FIG. 13A.

FIG. 13C is another perspective view of the output engagement mechanism housing of FIG. 13A.

FIG. 13D is a perspective view of an output engagement mechanism cap that can be used with the output engagement mechanism of FIG. 12A.

FIG. 13E is a perspective view of an engagement pin that can be used with the output engagement mechanism of FIG. 12A.

FIG. 13F is a cross-sectional view of the engagement pin of FIG. 13E.

FIG. 14 is a perspective view of a shift rod driver that can be used with the control system of FIG. 10A.

FIG. 15A is a perspective view of an output feedback rod that can be used with the control system of FIG. 10A.

FIG. 15B is a cross-sectional view of the output feedback rod of FIG. 15A.

FIG. 15C is a Detail C view of the shift rod member of FIG. 15A.

FIG. 15D is a cross-sectional view of another embodiment of the output feedback rod of FIG. 15A.

FIG. 16A is a perspective view of a shift rod sleeve that can be used with the control system of FIG. 10A.

FIG. 16B is a cross-sectional view of the shift rod sleeve of FIG. 16A.

FIG. 17A is a perspective view of a cap that can be used with the control system of FIG. 10A.

FIG. 17B is a cross-sectional view of the cap of FIG. 17A.

FIG. 18 is a perspective view of a shift rod nut that can be used in the control system of FIG. 10A.

FIG. 19A is a perspective view of a carrier nut that can be used with the IVT of FIG. 5.

FIG. 19B is a cross-sectional view of the carrier nut of FIG. 19A.

FIG. 20A is a top elevational view of a main shaft that can be used with the IVT of FIG. 5.

FIG. 20B is side elevational view of the main shaft of FIG. 20A.

FIG. 20C is a cross-sectional view of the main shaft of FIG. 20A.

FIG. 20D is a Detail D view of the main shaft of FIG. 20A.

FIG. 20E is a Detail E view of the main shaft of FIG. 20A.

FIG. 22A is a perspective view of the lower housing member of the housing assembly of FIG. 21.

FIG. 22B is a cross-sectional, perspective view of the lower housing member of FIG. 22A.

FIG. 22C is a Detail F view of the lower housing member of FIG. 22B.

FIG. 23A is a perspective view of an upper housing member of the housing assembly of FIG. 21.

FIG. 23B is a cross-sectional, perspective view of the upper housing member of FIG. 23A.

DETAILED DESCRIPTION OF CERTAIN INVENTIVE EMBODIMENTS

Figure 1:
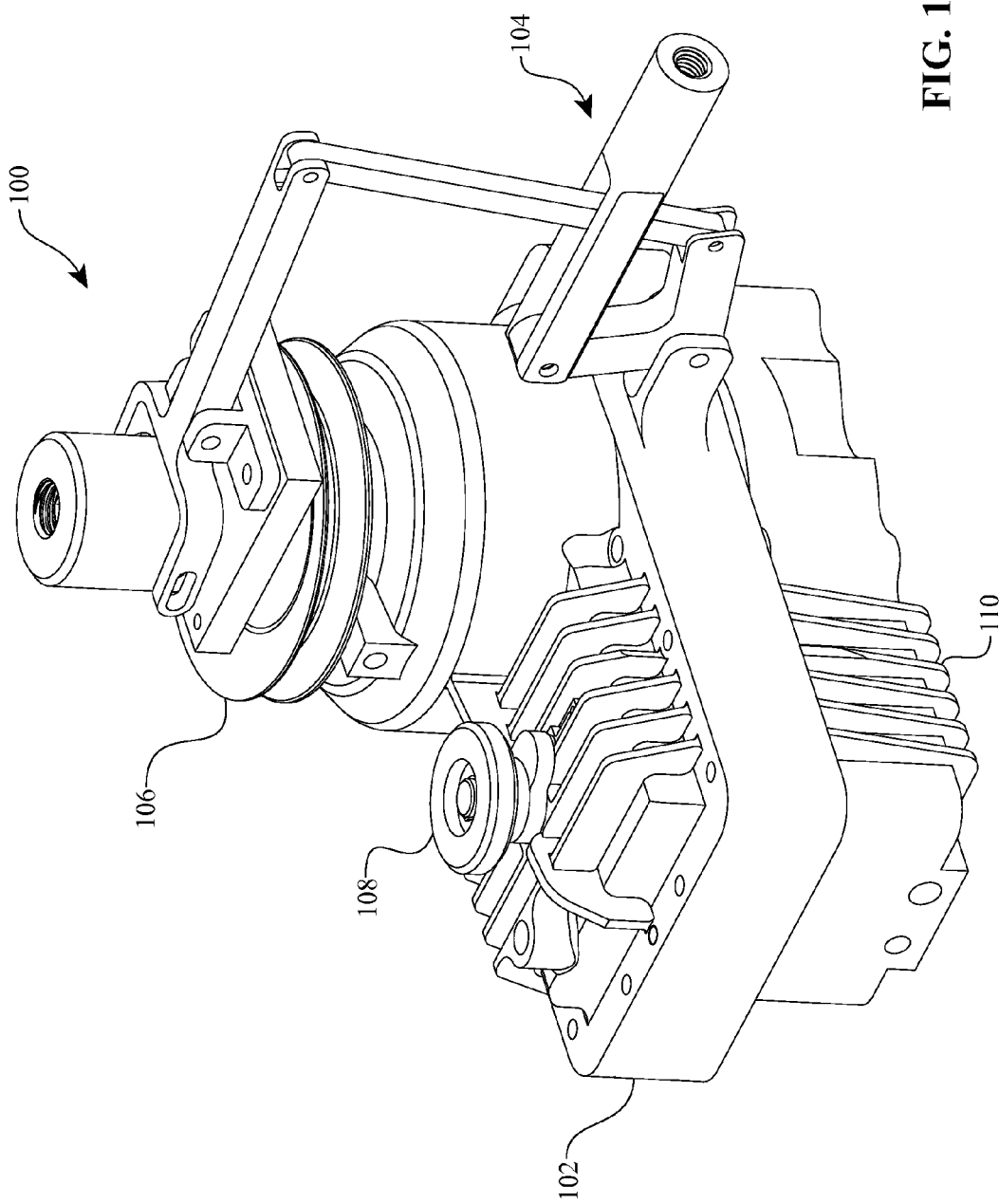
FIG. 1 is a perspective view of a transmission that uses an infinitely variable variator (IVT) in accordance with inventive embodiments disclosed herein.

The preferred embodiments will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described. The CVT/IVT embodiments described here are generally related to transmissions and variators disclosed in U.S. Pat. Nos. 6,241,636, 6,419,608, 6,689,012, 7,011,600, and U.S. patent application Ser. Nos. 11/243,484 and 11/543, 311. The entire disclosure of each of these patents and applications is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be obvious to a person of ordinary skill in the relevant technology.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components labeled similarly (for example, control piston 582A and control piston 582B) will be referred to collectively by a single label (for example, control pistons 582).

Referring to FIGS. 1-4, in one embodiment an infinitely variable transmission (IVT) 100 includes a housing assembly 102 adapted to cooperate with a control assembly 104. The IVT 100 can be coupled to a power input with an input pulley 106, for example. Among other things, the housing assembly 102 encloses most of the components of the IVT 100 and provides structural support for mounting the IVT 100 to, for instance, a vehicle frame or other components in the drivetrain such as a gearbox, differential, or axle. In some embodiments, the IVT 100 includes a manual neutral knob assembly 108 that can couple to certain components that are inside the housing assembly 102. The manual neutral knob assembly 108 can provide an interface to allow manual disconnection between the input pulley 106 and a driven device, such as a driven axle on a lawn tractor. In one embodiment, a number of cooling fins 110 are formed on the housing assembly 102. The cooling fins 110 can aid in thermal management of the IVT 100.

Figure 2:
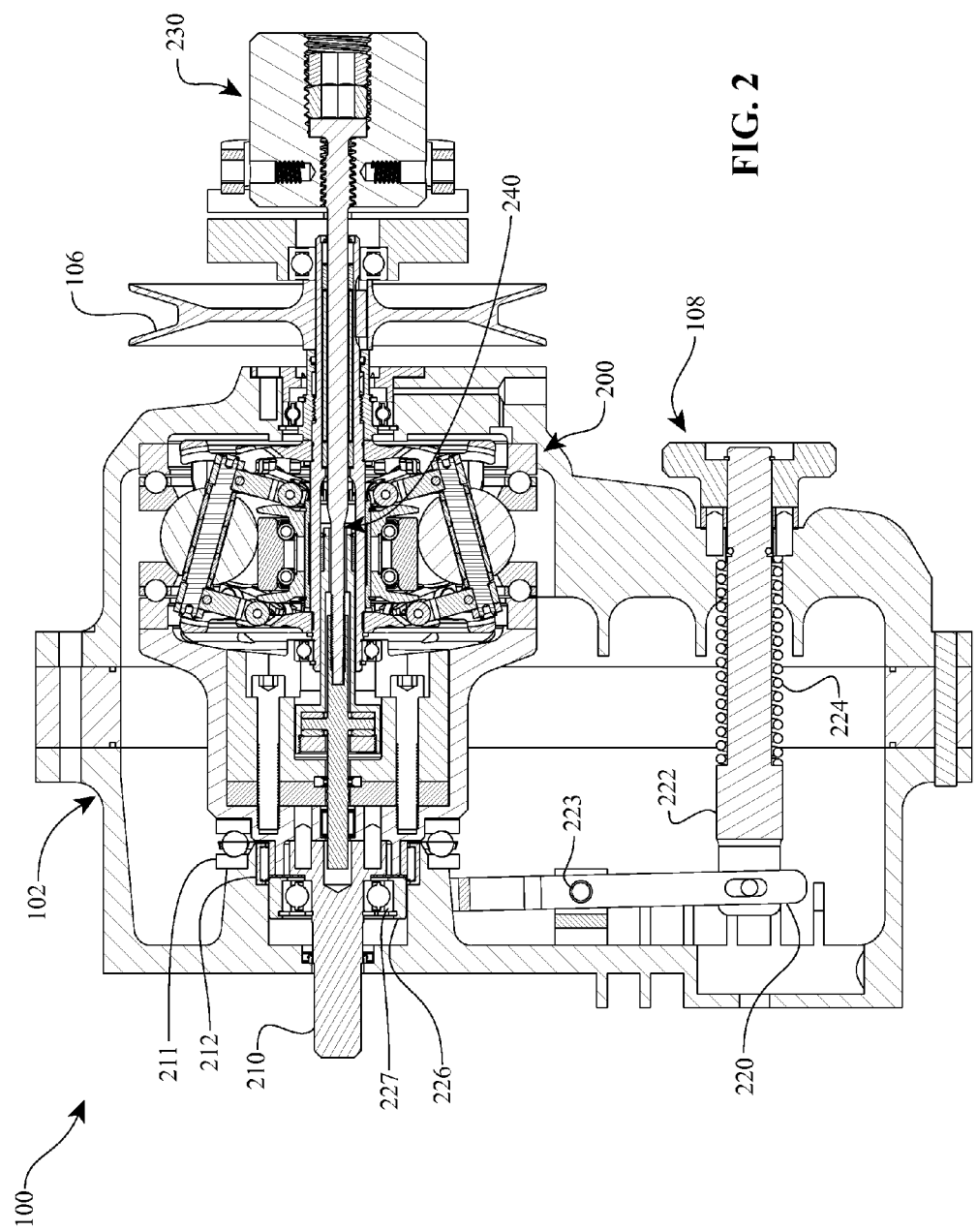
FIG. 2 is a cross-sectional view of the transmission of FIG. 1.

Turning now to FIG. 2 more specifically, in one embodiment of the IVT 100 the housing assembly 102 encloses a variator 200 that can be operably coupled to the input pulley 106 and to an output shaft 210. In some embodiments, the housing assembly 102 supports a neutral fork arm 220 which can couple to the manual neutral knob assembly 108. The manual neutral knob assembly 108 can be connected to a clevis member 222, for example. A holding spring 224 can be coupled to the clevis member 222. In one embodiment, adjustment of the manual neutral knob assembly 108, typically by rotation to a predetermined angular position, translates the clevis member 222 and energizes the holding spring 224, whereby adjustment of the manual neutral knob assembly 108 results in movement of the neutral fork arm 220 about a pivot 223. In some embodiments, the neutral fork arm 220 couples to a throw-out bearing housing 226, which throw-out bearing housing 226 is configured to engage and disengage the output shaft 210. An axial thrust bearing 211 and a needle roller bearing 212 can be provided to support, among other things, certain components of the variator 200.

Figure 3:
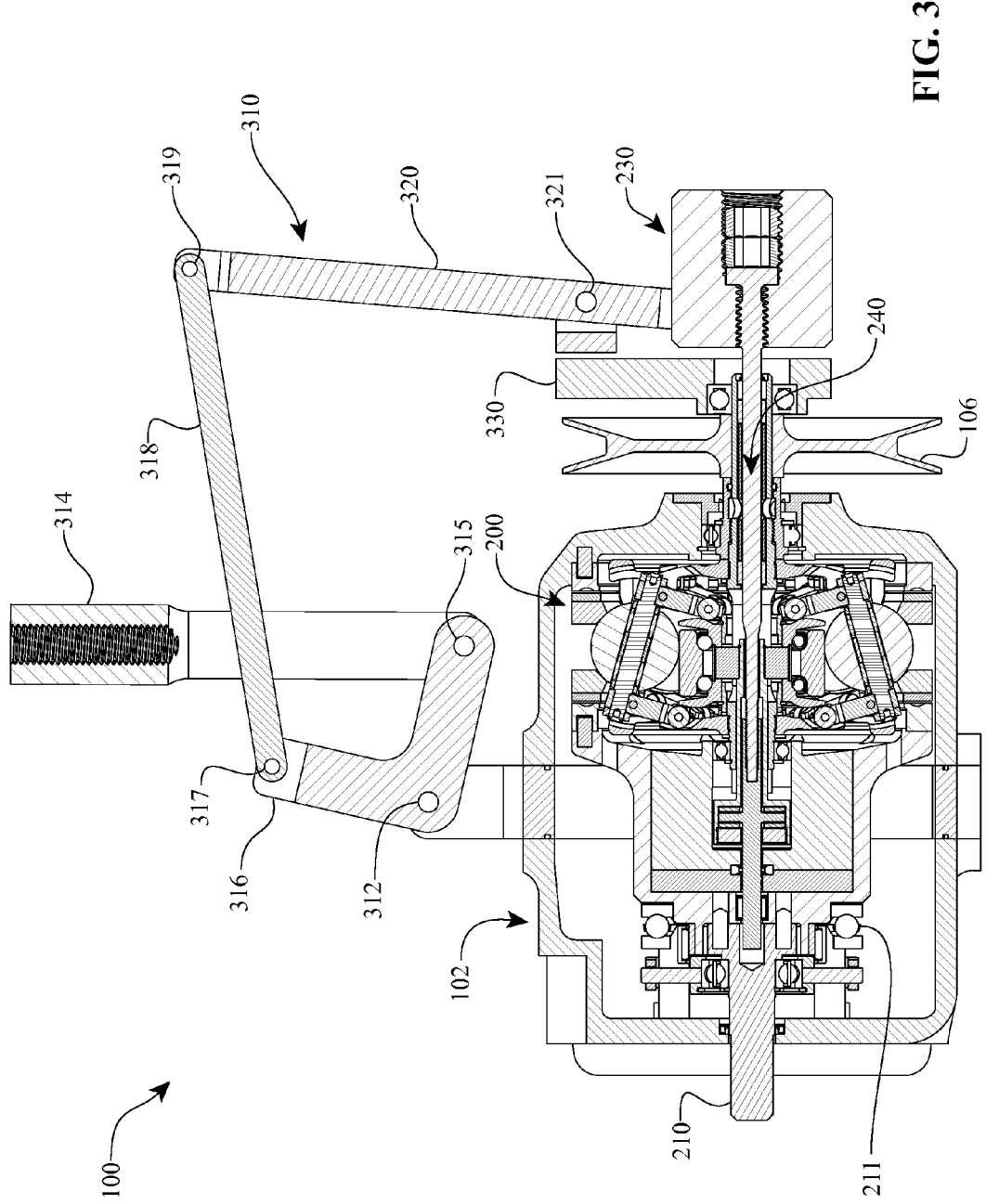
FIG. 3 is a second cross-sectional view of the transmission of FIG. 1.

In one embodiment, the IVT 100 includes a control interface mechanism 230 to facilitate adjustment of the speed ratio of the IVT 100. In some embodiments, the control interface mechanism 230 can be coupled to a ratio adjuster 240 that couples to certain components of the variator 200. As shown in FIG. 3, in one embodiment the control interface mechanism 230 can be coupled to a control linkage 310, which control linkage 310 can be supported on the housing 102 at a pivot 312, and which control linkage 310 couples additionally, in one embodiment, to a coupling member 314. The coupling member 314 is preferably adapted to interact with a user control interface such as a foot pedal or a hand lever (not shown) for communicating adjustments in transmission ratio from a user (or, alternatively or additionally, an automated or a semi-automated command system) to the IVT 100. In one embodiment of the control linkage 310, the coupling member 314 couples to a pivot 315 arranged on one end of a pivot lever 316. An intermediate linkage 318 couples to the pivot lever 316 at a pivot 317. Translation of the coupling member 314 tends to rotate the pivot lever 316 around the pivot 312 and, thereby, tends to translate the control linkage 318. In some embodiments, the control linkage 318 couples to a shift fork 320 at a pivot 319. The shift fork 320 couples to the control interface mechanism 230. The shift fork 320 can couple to a pivot 321, which in one embodiment is supported by a ground member 330. The ground member 330 can be attached to, for example, the vehicle chassis.

Figure 4:
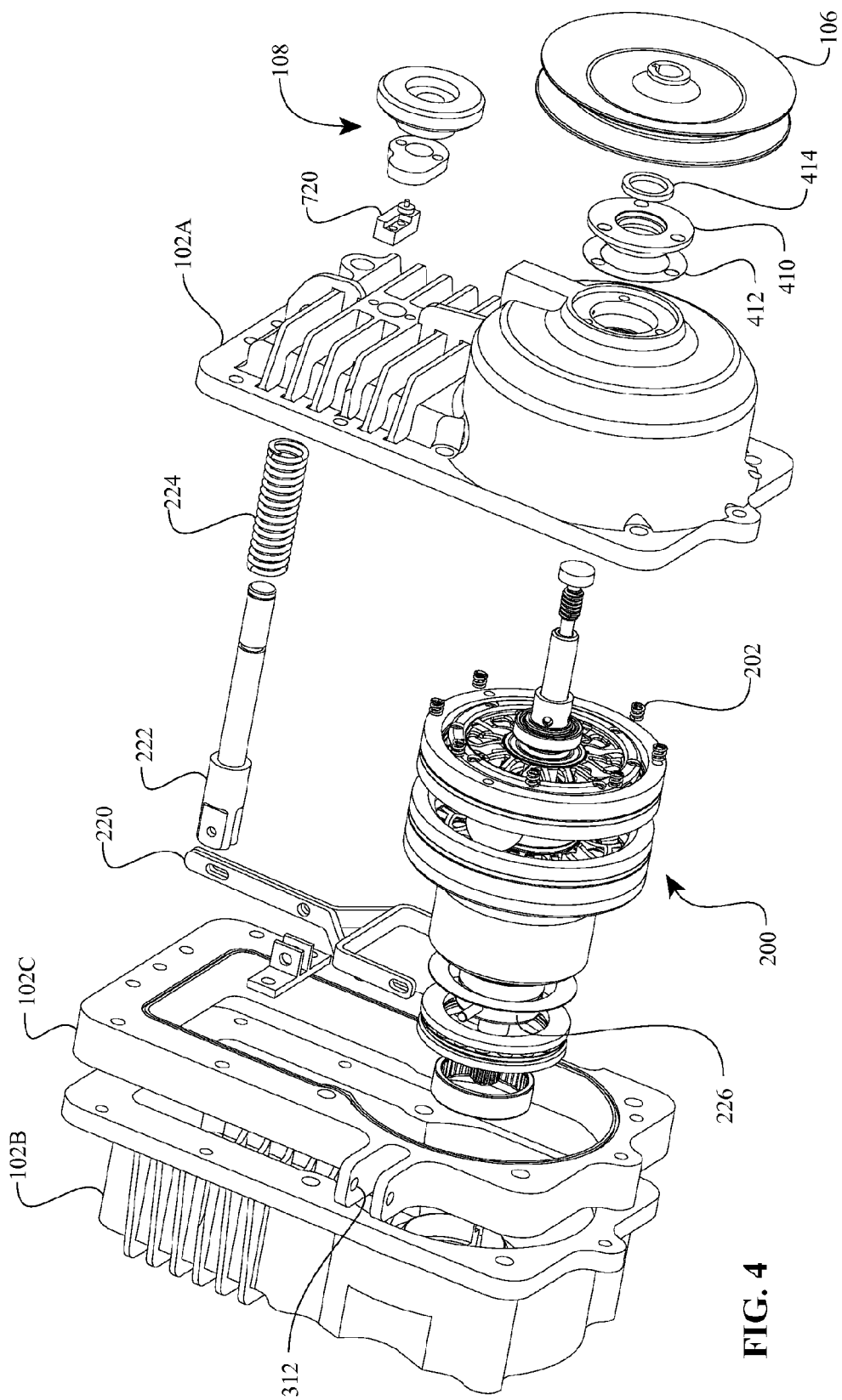
FIG. 4 is a partially exploded assembly view of the transmission of FIG. 1.

Turning now to FIG. 4, in one embodiment of the IVT 100, the housing assembly 102 can include an upper housing member 102A, an intermediate plate 102C, and a lower housing member 102B. The housing members 102A, 102B, and 102C are coupled in a suitable manner, such as with bolts, screws, or clamps. The variator 200 can be positioned on the interior of the housing assembly 102 and towards one side thereby creating an internal volume to provide, for instance, a reservoir for lubricant. In some embodiments, a housing cap 410, a flange seal 412, and a shaft seal 414 couple to the upper housing member 102A. The housing cap 410 can seal the IVT 100. The variator 200 can be provided with a number of springs, for example coil springs 202, which can couple the variator to the upper housing member 102A. The coil springs 202 can facilitate the provision of a preload on components of the variator 202.

Figure 5:
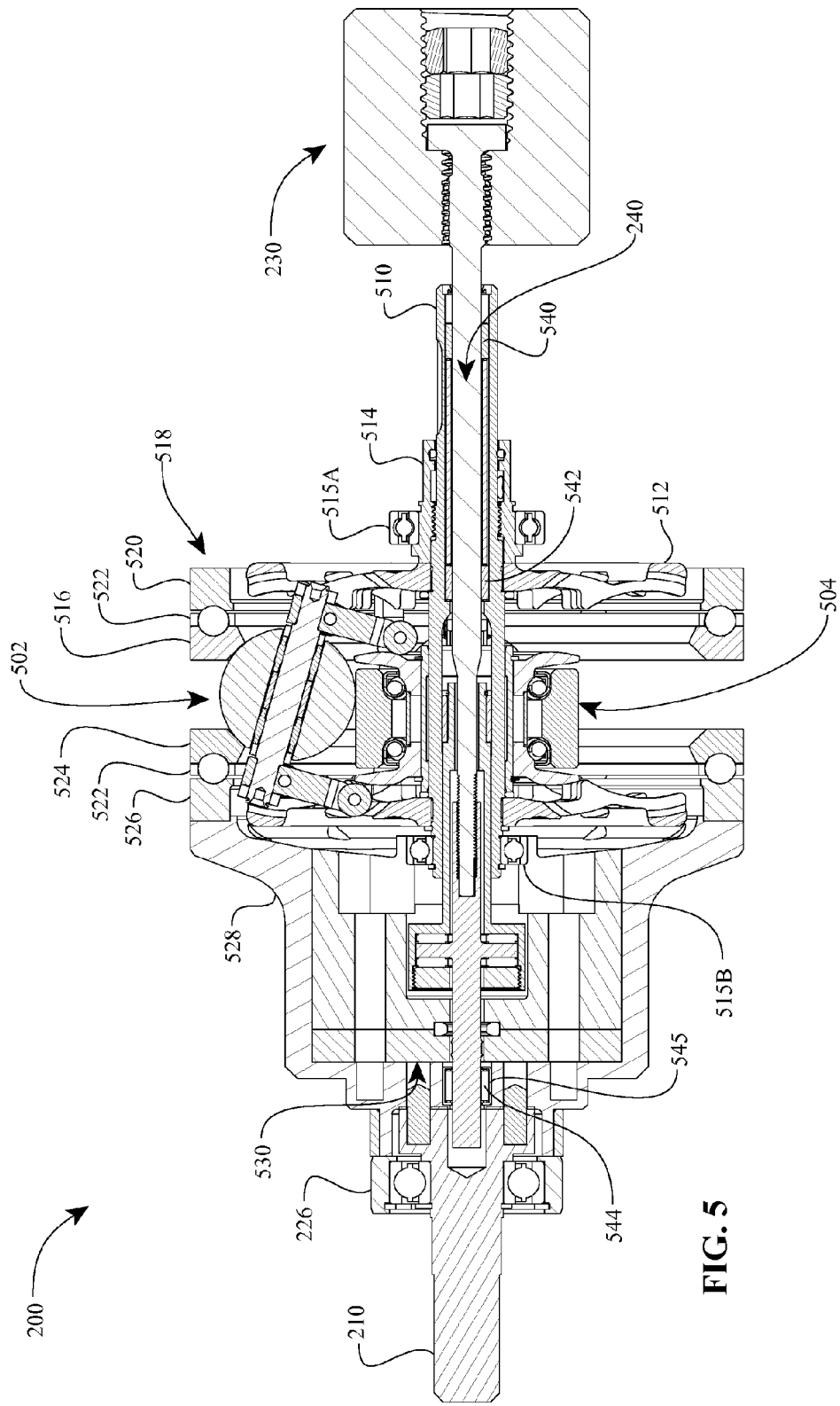
FIG. 5 is a cross-sectional view of an IVT that can be used with the transmission of FIG. 1.

Referring now to FIG. 5, in one embodiment a variator 200 is configured to receive input power from a pulley 106 on a main shaft 510. The main shaft 510 can be attached to a carrier 512 with a carrier clamp 514. Power is transferred to the carrier 512, which facilitates the infinitely variable ratio range. IVT functionality allows delivery of a zero output speed (a "powered zero" condition) with a non-zero input speed of a power delivery device. The carrier 512 provides support to a number of power roller assemblies 502, among other things. The carrier clamp 514 is configured to receive a support bearing 515A. In some embodiments, the bearing 515A can operably couple the variator 200 and the housing assembly 102. An exemplary power roller assembly 502 is described in U.S. patent application Ser. No. 11/543,311, the entire disclosure of which is hereby incorporated herein by reference. In one embodiment, a traction ring 516 couples to a clamp force generator assembly 518. The clamp force generator assembly 518 can include a reaction member 520 and a number of load cam rollers 522. In some embodiments, the reaction member 520 couples to the upper housing member 102A with, for example, dowel pins and coil springs 202. The variator 200 can be configured to have an output traction ring 524 in contact with the power roller assembly 502. The output traction ring 524 can couple to a second axial force generator mechanism that includes a number of load cam rollers 522 and to a reaction member 526. The reaction member 526 can attach to an output member 528 with, for instance, dowel pins, so that relative motion between the two members is prevented. In other embodiments, the coupling between the reaction member 526 and the output member 528 can be a frictional coupling.

Figure 6:
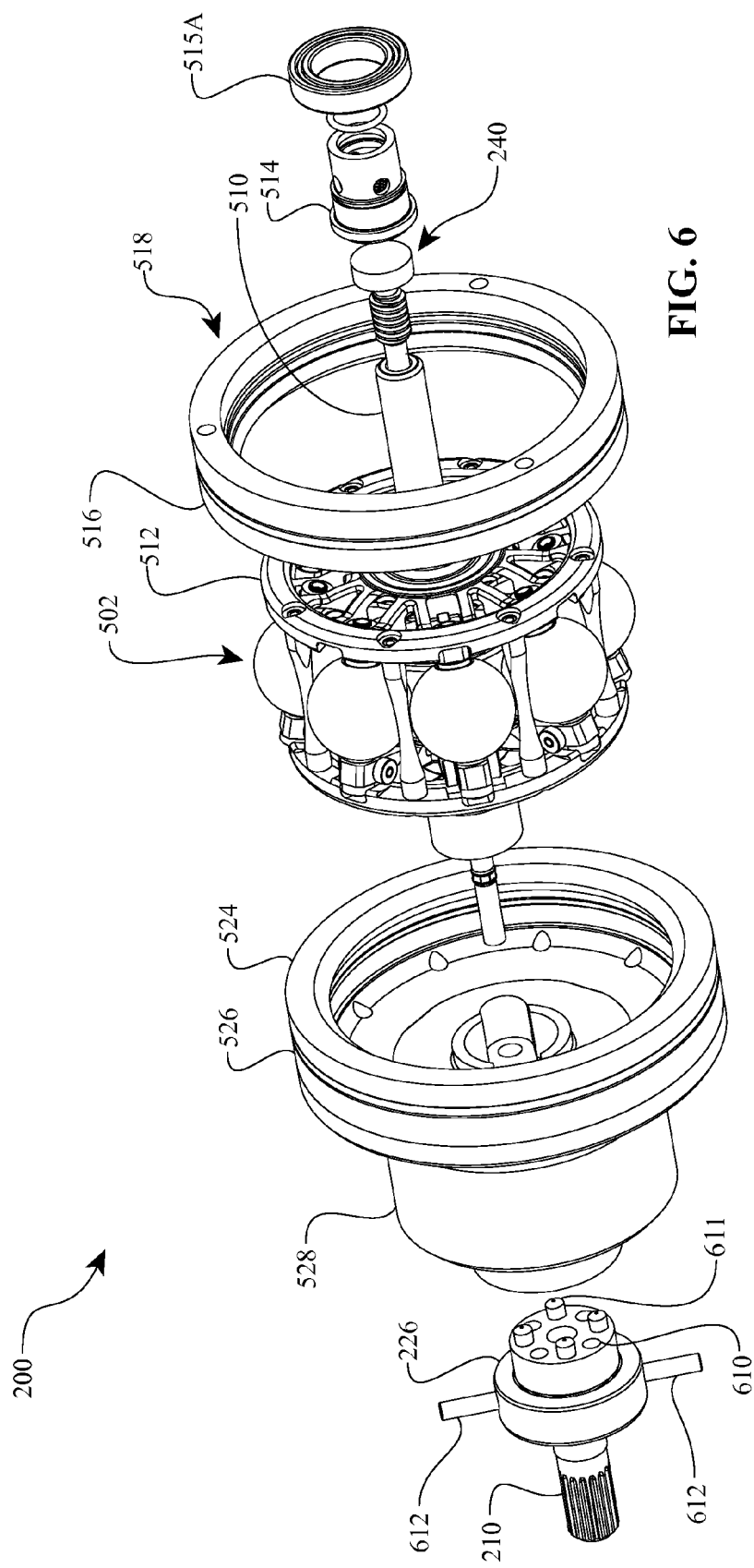
FIG. 6 is an exploded assembly view of certain components of the IVT of FIG. 5.

Referring now to FIG. 5 and FIG. 6, in one embodiment of the variator 200, a ratio adjuster 240 can be arranged coaxially and radially inward of the main shaft 510. The ratio adjuster 240 can couple to an idler assembly 504. An adjustment of the ratio adjuster 240 tends to translate axially the idler assembly 504, thereby adjusting the speed ratio of the IVT 100. In some embodiments, the ratio adjuster 240 can couple to an output engagement mechanism 530. Under certain operating conditions, such as powered zero, the output member 528 can be operably coupled to the ratio adjuster 240. In one embodiment, the ratio adjuster 240 is supported radially along the central axis of the variator 200 by bearings 540 and 542, which can be coupled to the main shaft 510. The ratio adjuster 240 can be additionally supported by a bearing 544 that is received and supported by the output member 528 in a bore 545.

Turning to FIG. 2 and FIG. 6, in one embodiment of the variator 200, the output shaft 210 is coupled to the output member 528 with, for example, a number of dowels 611. The dowels 611 can be arranged angularly about, and substantially coaxial with, the main axis of the IVT 100. The output shaft 210 and the output member 528 can be rigidly linked during operation. The throw-out bearing housing 226 can be coupled to the output shaft 210 with, for instance, a radial ball bearing 227. The throw-out bearing housing 226 can be radially supported in the housing assembly 102 and constrained from rotation with at least two dowels 612. The dowels 612 can also couple to the neutral fork arm 220. The neutral fork arm 220 can be used to translate axially the throw-out bearing housing 226 thereby selectively engaging and disengaging the output shaft 210 from the output member 528.

Passing now to FIG. 7A, in one embodiment of the IVT 100, a neutral lock out mechanism 700 can be coupled to the variator 200. The neutral lock out mechanism 700 can include a throw-out bearing housing 226 coupled to one end of a neutral fork arm 220. The neutral fork arm 220 can be supported at a pivot 223 with a bracket 730. The clevis member 222 can be connected to the neutral fork arm 220 at pivot 722. The neutral knob assembly 108 can include, in one embodiment, a knob 710 and a switch cam 712. The neutral knob assembly 108 can couple to one end of the clevis member 222. In some embodiments, a spring 224 can cooperate with the clevis member 222. One end of the spring 224 couples to the clevis member 222 while the other end of the spring 224 couples to the housing 102. In some embodiments, a kill switch 720 couples to the switch cam 712 thereby allowing the activation of the neutral lock out mechanism 700 to be communicated to, for example, the electrical system of a vehicle. During operation of the IVT 100, the neutral lock out mechanism 700 is inactive and therefore the neutral throw-out bearing housing 226 is positioned to allow engagement of the output shaft 210 with the output member 528. During certain operating conditions, it is desirable to decouple the variator 200 from the output shaft 210. The neutral lock out mechanism 700 can be used for this purpose. The neutral knob assembly 108 can be adjusted to a predetermined position by pulling the knob 710 away from the housing 102 and rotating the knob 710 through an arc of, for example, about 90 degrees. This action translates the clevis member 222, compresses the spring 224 between the housing 102 and the clevis member 222, and pivots the neutral fork arm 220, thereby axially translating the throw-out bearing housing 226.

Turning to FIG. 7B through FIG. 7D, in one embodiment the neutral knob 710 can be a substantially cylindrical body formed with a central bore 711. The central bore 711 can be adapted to receive one end of the clevis member 222. The neutral knob 710 can have a shoulder 713 that extends from the main body. The shoulder 713 can be adapted to mate with the switch cam 712. In one embodiment, the switch cam 712 includes a main bore 716 and a number of guide bores 717. The guide bores 717 can facilitate the selective coupling of the switch cam 712 to a housing member such as housing member 102A via a number of dowel pins (not shown). The body of the switch cam 712 can have a switch cam extension 715 adapted to couple to the kill switch 720. In one embodiment, the kill switch 720 includes a switch button 721 supported in a housing 722. A number of fastener holes 723 can be provided in the housing 722 to facilitate, for example, attaching the kill switch 720 to the chassis of a vehicle.

Referring now to, FIGS. 8A and 8B, in one embodiment an output shaft 210 is adapted to cooperate with the neutral throw-out bearing housing 226. A ball bearing 227 can be supported in the neutral throw-out bearing housing 226. The ball bearing 227 can be supported by the output shaft 210 on a bearing seat 818. A snap ring 811A can be inserted in a snap ring groove 820; the snap ring 811A is suitably adapted to secure bearing race 810. Likewise, a snap ring 811B can be provided to secure a bearing race of the bearing 227 in the neutral throw-out bearing housing 226. In one embodiment, the output shaft 210 has a splined end 824 and a flange end 816. The flange end 816 can include a number of holes 610 adapted to receive, for example, the dowels 611. The output shaft 210 can be provided with a seal surface 822 adapted to receive a shaft seal, for example. The end 816 can include a counter bore 812 to provide clearance for certain components of the ratio adjuster 240.

Turning to FIGS. 9A-9C, in one embodiment the output member 528 can be a generally hollow cylindrical body with an output member end 911A and an output member end 911B. The output member end 911A is adapted to couple to the axial force reaction member 526. The output member end 911B is adapted to couple to the output shaft 210. In some embodiments, a number of dowel bores 910 are formed on the output member end 911A. The dowel bores 910 are adapted to constrain a number of dowels 611. The dowels 611 can couple the output member 528 to the axial force reaction member 526. In some implementations, a number of drain holes 912 can be arranged radially on the outer circumference of the output member 528. The drain holes 912 facilitate the drainage of lubricant from the interior of the variator 200. Focusing now on the output member end 911B, a shoulder 914 can be provided to mate with the axial thrust bearing 211 (see, for example, FIG. 2). In some embodiments, a flange surface 916 is provided with bores 915 to receive a number of dowels 611. The flange surface 916 can mate with the output shaft 210. A cylindrical shoulder 917 can extend from the flange surface 916 to provide support for the needle roller bearing 212 (see, for example, FIG. 2). Among other things, the shoulder 914 and the shoulder 917 support the variator 200 in the housing assembly 102. The inner bore of the output member 528 is substantially cylindrical and can have, for example, a number of flat spring reaction surfaces 920 that can be configured to mate with an output engagement mechanism 530 (see, for example, FIG. 5).

Referring to FIGS. 10A, 10B, 10C, and 10D now, a control system 1000 that can be adapted to cooperate with the variator 200 will be described. In one embodiment, the control system 1000 includes a control interface mechanism 230, a ratio adjuster 240, and an output engagement mechanism 530. In some embodiments, the ratio adjuster 240 includes a shift rod subassembly 1001 and a shaft subassembly 1002. In one embodiment, the shift rod subassembly 1001 includes a shift rod driver 1001A and an output feedback rod 1001B. The shift rod driver 1001A and the output feedback rod 1001B can be coupled with threads 1003, for example. Once assembled, the shift rod driver 1001A and the output feedback rod 1001B form a substantially rigid shift rod subassembly 1001. The shaft subassembly 1002 can be arranged radially outward of and coaxially with the shift rod subassembly 1001. In some embodiments, the shaft subassembly 1002 includes a shift rod sleeve 1002A coupled to a cap 1002B. The shift rod sleeve 1002A can be configured to adapt to a shift nut 1006. The shift nut 1006 can be retained on or by the shift rod sleeve 1002A with, for example, a snap ring 1007. The shift nut 1006 can be further coupled to the idler assembly 504 (See, for example, FIG. 5). The shaft subassembly 1002 is supported on the shift rod subassembly 1001 with, for example, bearings 1004 and 1005. The bearings 1004 and 1005 can be, for example, needle roller bearings and can be constrained between the shift rod subassembly 1001 and the shaft subassembly 1002.

Referring now to FIGS. 10A, 11A and 11B, in one embodiment a control interface mechanism housing 1100 is a substantially cylindrical body with a central bore 1102 having two portions of different diameters. One portion of the central bore 1102 is threaded with, for example, a straight thread 1106. The threaded portion 1106 can be adapted to receive adjustment members 1020 and 1021. The adjustment members 1020 and 1021 constrain certain parts of the ratio adjuster 240 during operation. The central bore 1102 can include a second threaded portion having, for example, an acme thread 1108. The acme thread 1108 can be configured to mate with a threaded portion of the shift rod driver 1001A. The control interface mechanism housing 1100 can include tapped holes 1104A and 1104B to connect to, for example, the shift fork 320 with fasteners such as bolts or screws (not shown).

Figures 12A, 12B:
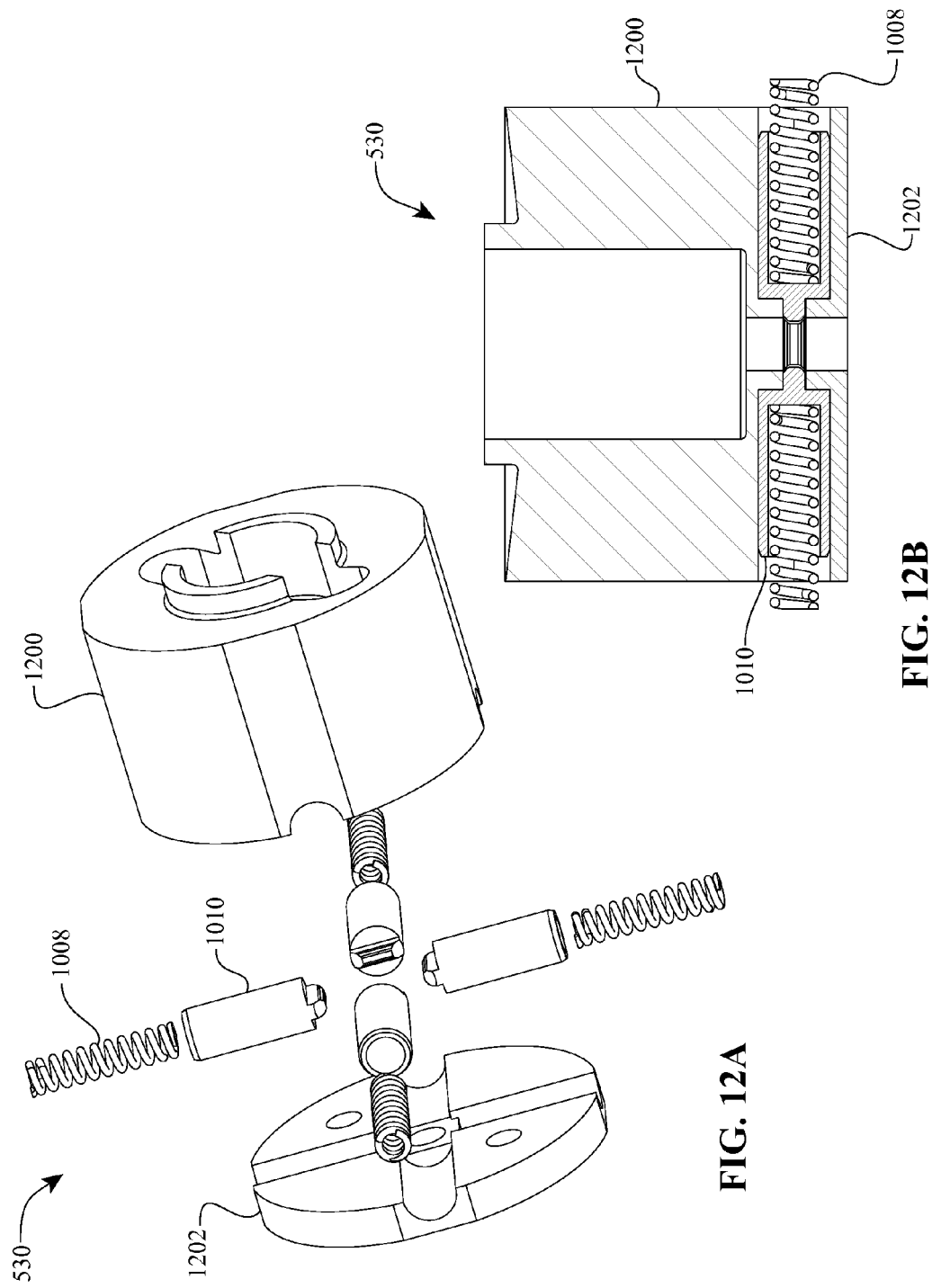
FIG. 12A is an exploded assembly view of certain components of an output engagement mechanism that can be used with the control system of FIG. 10A.
FIG. 12B is a cross-sectional view of the components of the output engagement mechanism of FIG. 12A.

Turning now to FIGS. 12A and 12B, in one embodiment the output engagement mechanism 530 can be a mechanical coupling configured to facilitate a selective connection between, for example, the output member 528 and the ratio adjuster 240. In some embodiments, the output engagement mechanism 530 rotates with, for example, the output member 528. In one embodiment, the output engagement mechanism 530 includes a generally cylindrical housing 1200 coupled to a retaining cap 1202. The engagement mechanism housing 1200 and the retaining cap 1202 enclose a number of springs 1008 and pins 1010. In the illustrated embodiment, four pins 1010 and four springs 1008 are arranged angularly about the central axis of the housing 1200. The output engagement mechanism 530 is configured to cooperate with the variator 200. In one embodiment, the output engagement mechanism 530 surrounds certain components of the ratio adjuster 240. Under certain operating conditions, such as powered zero, the output engagement mechanism 530 can couple to certain components of the ratio adjuster 240, for example, the output feedback rod 1001B. In some implementations, the output engagement mechanism 530 turns the output feedback rod 1001B thereby shifting the variator 200.

Turning to FIGS. 13A-13F, in one embodiment the housing 1200 includes a generally cylindrical body with a central bore 1302. One end of the housing 1200 can include a shoulder 1310. The shoulder 1310 can facilitate the radial and axial alignment of the bearing 515B (see FIG. 5). In some embodiments, a number of flat surfaces 1312 can be arranged on the outer circumference of the housing 1200. The flat surfaces 1312 generally cooperate with the spring reaction surfaces 920 formed on the inner bore of output member 528 (see, for example, FIG. 9A). A number of holes 1314 provide clearance for fasteners that secure the housing 1200 to both the retaining cap 1202 and the output member 528 with, for example, bolts. A number of counter bores 1316 can be formed in the housing 1200 to provide clearance to, for example, bolt heads (not shown). The central bore 1302 is generally sized to provide clearance for certain components of the ratio adjuster 240. The housing 1200 can additionally include a number of channels 1318 and reaction surfaces 1320 formed on the end of the housing 1200 that is opposite to the end of the housing 1200 having the shoulder 1310. The channels 1318 can be arranged to support the pins 1010. Similarly, the retaining cap 1202 is a generally cylindrical disk with a central bore 1303 that can provide clearance for certain components of the ratio adjuster 240. A number of holes 1315 can be provided on the retaining cap 1202 and adapted to cooperate with the holes 1314. A number of channels 1319 are configured to cooperate on one face of the retaining cap 1202. The channels 1319 are substantially similar to the channels 1318 and are adapted to receive the pins 1010. The retaining cap includes a number of reaction surfaces 1321, which are adapted to mate with the pins 1010. The pins 1010 can be generally hollow cylindrical bodies with an inner counter bore 1334. The pins 1010 include a number of external reaction surfaces 1330 adapted to mate with, for instance, the reaction surfaces 1320 and 1321. Each inner bore 1334 is adapted to receive a spring 1008 (see, for example, FIG. 12B). The springs 1008 are configured to press the pins 1010 against the reaction surfaces 1320 and 1321. The pins 1010 can couple to certain components of the ratio adjuster 240 with an engagement shoulder 1332 that extends from the reaction surface 1330 of the pin 1010. In one embodiment, the reaction surfaces 1320 and 1321 are configured to prevent the engagement shoulder 1332 from contacting the ratio adjuster 240 during certain operating conditions, namely conditions with non-zero output speed, for example.

Passing now to FIGS. 14-18, in one embodiment a shift rod driver 1001A includes a generally cylindrical rod 1410 formed with a reaction flange 1412 on one end and a fastening thread 1003 on the other end. A screw lead 1414 can be an acme thread, for example, adapted to cooperate with the acme thread 1108 provided in the control interface housing 1100 (see, for example, FIG. 11A). The reaction flange 1412 can be configured to cooperate with the control interface housing 1100 and the adjustment members 1020 and 1021 (see, for example, FIG. 10A). The fastening thread 1003 couples the shift rod driver 1001A to the output feedback rod 1001B. In one embodiment, the output feedback rod 1001B can be a substantially cylindrical body provided with a threaded bore 1510 on one end, a bearing flange 1514, and a number of engagement surfaces 1512. The bearing flange 1514 includes reaction surfaces 1516 and 1518. The reaction surfaces 1516 and 1518 are adapted to cooperate with, for example, needle bearings 1004 and 1005, respectively. The engagement surfaces 1512 can be adapted to cooperate with the output engagement mechanism 530 and the engagement shoulder 1332 on the pin 1010. A number of profiled ramps 1520A and 1520B can be formed on the output feedback rod 1001B. Preferably, the profiled ramps 1520 are adapted to guide and capture the engagement shoulders 1332. In some embodiments, a number of engagement surfaces 1530 can be formed on the output feedback rod 1001B. The engagement surfaces 1530 can be substantially similar in function to the engagement surfaces 1512. A number of profiled ramps 1532A and 1532B can be arranged to cooperate with the engagement shoulders 1332 for guiding and capturing the pins 1010.

Turning to FIGS. 16A-17B, in one embodiment, the shift rod sleeve 1002A can be a generally hollow cylindrical body having a first bore 1730 and a second bore 1732. The shift rod sleeve 1002A can be operationally coupled to the variator 200, and more specifically to the idler assembly 504. The two bores 1730 and 1732 are configured to provide clearance for the shift rod driver 1001A and the output feedback rod 1001B. The shift rod sleeve 1002A can be formed with a cup end 1702, which is adapted to enclose a number of needle bearings 1004 and 1005. The cup end 1702 includes threads 1710 configured to mate with the threads 1610 of the retaining cap 1002B. The reaction face 1712 can support the bearing 1004, for example. A reaction face 1620 can be provided on one end of the retaining cap 1002B. The reaction face 1620 can support the bearing 1005 (see, for example, FIG. 10B). In some embodiments, the shift rod sleeve 1002A can include a surface 1720 and a shoulder 1721 adapted to receive, for example, the inner bore 1830 of a shift nut 1006. The shift nut 1006 can be secured to the shift rod sleeve 1002A by a snap ring 1007 (see, for example, FIG. 10A) received in a groove 1722. In one embodiment, the retaining cap 1002B can be a generally cylindrical disk with a central bore 1614. Threads 1610 can be provided on the outer circumference of the cylindrical disk to mate with the cup end 1702. The retaining cap 1002B can further include a number of counter bores 1612, which are adapted to receive a tool, for example pliers, for fastening the cap to the shift rod sleeve 1002A.

Referring now to FIG. 18, in one embodiment the shift nut 1006 can be a generally rectangular body with a central bore 1830 adapted to mate with, for example, the surface 1720 and the shoulder 1721 of the shift rod sleeve 1002A. Shoulders 1832 and 1833 are configured to adapt to the idler assembly 504; hence, during operation, in one embodiment the shift nut 1006 rotates and translates with the idler assembly 504. The shift nut 1006 couples to the shift rod sleeve 1002A.

During operation of the IVT 100, a zero output speed condition or powered zero condition may be desired. The command for a zero output speed can be transmitted to the IVT 100 by the control linkage 310 (see, for example, FIG. 3). In one embodiment of the variator 200, the zero output speed condition generally corresponds to an arrangement wherein the axis of rotation of the power rollers of the power roller assembly 502 has a tilt angle substantially equal to zero relative to the longitudinal axis of the variator 200. The tilt angle of the power roller assembly 502 generally corresponds to an axial translation of the idler assembly 504. Consequently, the zero output speed condition corresponds to a particular axial position of the idler assembly 504. Typically, the engagement surfaces 1512 of the output feedback rod 1001B align with the engagement pins 1010 during the zero output speed condition. The engagement pins 1010 couple the shift rod assembly 1001 to the output member 528, consequently a change in output speed can be communicated to the ratio adjuster 240. The coupling of the threads 1108 to the threads 1414 result in the conversion of the rotational input from the output member 528 into an axial translation of the shift rod assembly 1001. The shift rod assembly 1001 can have a minimal degree of allowable rotational and axial travel with respect to the control interface mechanism housing 1100. The amount of allowable rotational and axial travel can be adjusted with the adjustment members 1020 and 1021. The adjustment members 1020 and 1021 define the allowable axial travel of shift rod assembly 1001 with respect to the control interface mechanism housing 1100. The axial translation of the shift rod assembly 1001 axially translates the idler assembly 504 thereby tilting the power roller assemblies 502 to achieve an adjustment of speed ratio of the variator 200, for instance to bring the output speed to zero. Preferably, during the zero output speed condition, the control interface mechanism housing 1100 is substantially stationary and the axial movement of the shift rod assembly 1001 is substantially undetectable to the user of the IVT 100. For example, a user would not notice the IVT 100 shifting to maintain the zero output speed condition. The length of the engagement surfaces 1512 defines the ratio range around a zero speed for which the engagement pins 1010 affect the speed ratio of the variator 200. When the user shifts the shift rod assembly 1001 substantially away from a zero speed ratio such that the engagement surfaces 1512 are not aligned with the engagement pins 1010, the engagement pins do not contact the output feedback rod 1001B.

Turning now to FIGS. 19A-19B and referring again to FIG. 5, in one embodiment a carrier clamp 514 includes a generally cylindrical body with a central bore. A number of holes 1912 can be provided to, among other things, facilitate the delivery of lubricant, such as transmission fluid, to the central axis of the variator 200. The carrier clamp 514 includes a threaded portion 1910 formed on the central bore to couple the carrier clamp 514 to the main shaft 510. Among other things, the carrier clamp 514 operationally couples the main shaft 510 to the carrier 512. The central bore can be further provided with a groove 915, which can be adapted to receive, for example, an o-ring. In one embodiment, the carrier clamp 514 includes a reaction surface 1916 on one end. The reaction surface 1916 is configured to couple to the carrier 512. A shoulder 1932 and a reaction surface 1930 can be provided to support the bearing 515A that axially supports the carrier 512. The carrier clamp 514 can include a groove 1934 for receiving a snap ring that aids in retaining the bearing 515A. A number of flats 1920 can be formed on the outer circumference of the carrier clamp 514. The flats 1920 can facilitate the mounting of the carrier clamp 514 onto the main shaft 510.

Passing now to FIGS. 20A-20E and still referencing FIG. 5, in one embodiment the main shaft 510 can be a generally cylindrical body having a first central bore 2010 and a second central bore 2012. In some embodiments, the central bores 2010 and 2012 are adapted to receive a number of support bearings, such as bearings 540 and 542, which are configured to support certain components of the ratio adjuster 240. The main shaft 510 can include a number of slots 2014 that are adapted to receive the shift nut 1006 (see, for example, FIG. 3). In one embodiment, the slots 2014 provide axial clearance for the shift nut 1006. The main shaft 510 can include a slot 2016 having a crescent shape to receive, for example, a key that can couple the input pulley 106 to the main shaft 510. A number of lubrication holes 2020 can be formed on one end of the main shaft 510. In this embodiment, two lubrication holes 2020 are provided on the main shaft 510 and are configured to align with the lubrication holes 1912 on the carrier clamp 514. A seal groove 2030 can be provided on one end of the main shaft 510. In one embodiment, the main shaft 510 includes a bearing support shoulder 2032 that can be located in the first central bore 2010. The bearing support shoulder 2032 can be configured to couple to the bearing 542, for example. During operation, lubricant can be directed along the inner bore of the main shaft 510. The seal groove 2030 can retain a shaft seal, for example, to prevent leakage of lubricant from the inner bore of the main shaft 510.

Referring specifically to FIGS. 20D and 20E, in one embodiment the main shaft 510 includes a number of knurls 2040A and 2040B. The knurls 2040A and 2040B can be configured to facilitate the rigid coupling of the main shaft 510 to the carrier 512. One end of the main shaft 510 can include a set of threads 2042 to engage the carrier clamp 514. A snap ring groove 2041 can be formed on the other end of the main shaft 510. The groove 2041 is configured to receive a snap ring for axially securing the carrier 512. A bearing surface 2044 can be provided on the main shaft 510 for supporting the bearing 515B. Snap ring grooves 2043 and 2046 receive, for example, snap rings that can axially retain the support bearing 515B.

Figure 21:
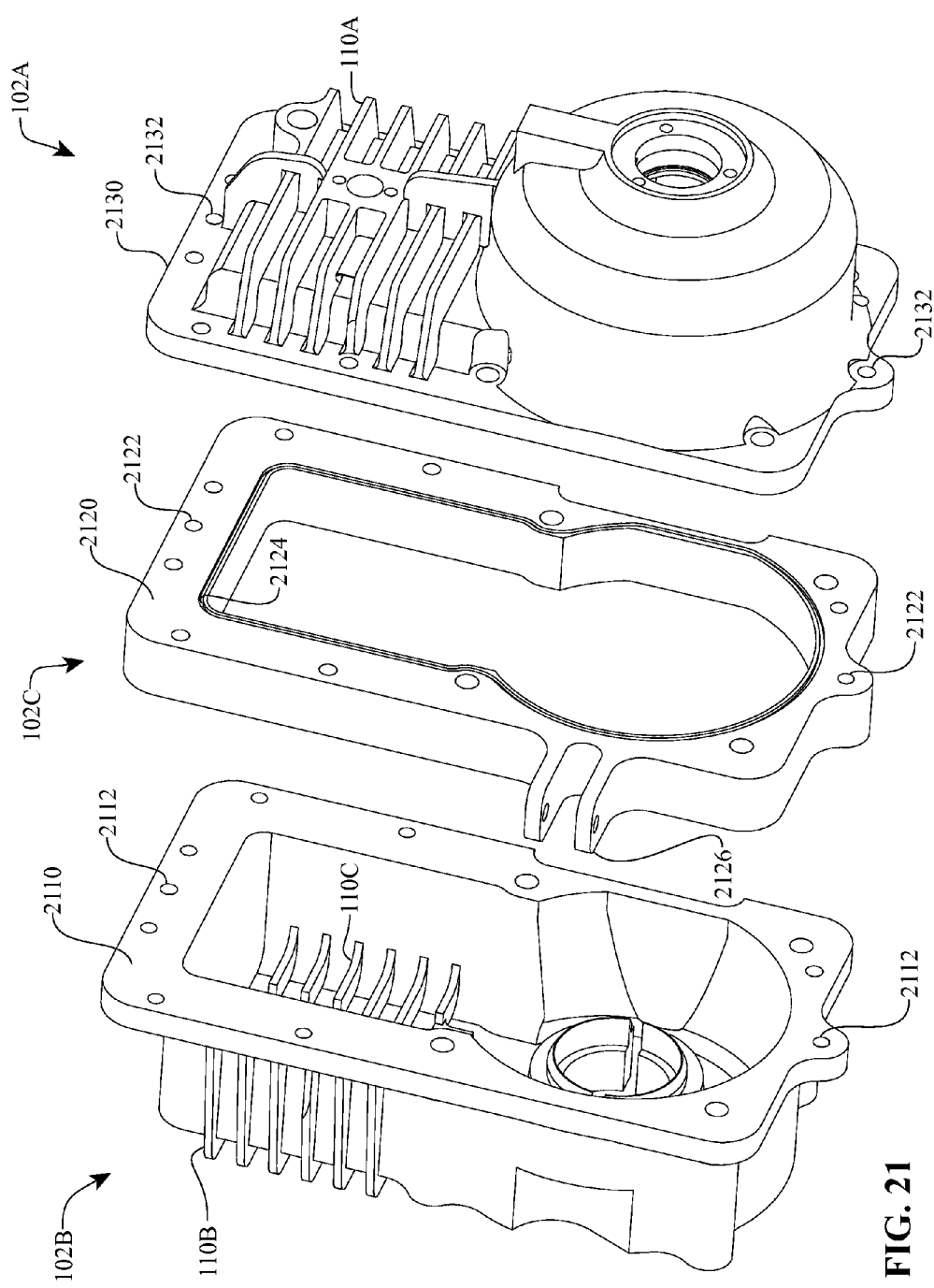
FIG. 21 is an exploded assembly view of a housing that can be used with the transmission of FIG. 1.

Passing now to FIG. 21, in one embodiment the housing assembly 102 includes an upper housing member 102A, an intermediate plate 102C, and a lower housing member 102B. The upper housing member 102A can include a number of holes 2132 for receiving fasteners such as bolts. Likewise, a number of holes 2122 and 2112 can be provided on the intermediate plate 102C and the lower housing member 102B, respectively. The holes 2132, 2122, and 2112 can be arranged on flange surfaces 2130, 2120, and 2110, respectively. The flange surfaces 2130, 2120, and 2110 can generally extend around the perimeter of the respective housing assembly members 102B, 102C, and 102A, and provide a base for, among other things, sealing the IVT 100. A groove 2124 can be provided on the intermediate plate 102C to receive an o-ring (not shown). A bracket 2126 can further be provided on the intermediate plate 102C. The bracket 2126 is configured to support the pivot lever 316. The cooling fins 110A can be formed on the external surface of the housing member 102A. Likewise, the cooling fins 110B can be formed on the external surface of the housing member 102B. A number of internal cooling fins 110C can further be provided on the interior surface of the lower housing member 102B.

Turning now to FIGS. 22A-22C, in one embodiment the lower housing member 10213 can include a support hub 2210. The support hub 2210 can be formed on the interior surface of the lower housing member 102B. The support hub 2210 is adapted to cooperate with the output shaft 210 and the neutral throw-out bearing housing 226. A seal surface 2220 can be provided to receive, for example, a shaft seal. A shoulder 2222 can be provided that supports the bearing 211. Likewise, a shoulder 2224 can be provided to support the bearing 212. A number of grooves 2226 can be formed on the support hub 2210 to retain the dowels 612 of the throw-out bearing housing 226. A clearance bore 2202 can be provided on the lower housing member 102B. The output shaft 210 extends from the IVT 100 at the clearance bore 2202. A drain hole 2204 allows for removal of lubricant from the housing assembly 102. A number of through bores 2206 can be provided on the lower housing member 102B and can be adapted to mount the IVT 100 to a vehicle structure.

Referring now to FIGS. 23A and 23B, in one embodiment the upper housing member 102A can include a number of dowel bores 2302 arranged on the internal cavity of the housing member 102A. The dowel bores 2302 can be configured to couple to certain components of the variator 200. In particular, the dowel bores 2302 can receive dowels that couple to the axial force generator assembly 518. A shoulder 2304 can support a snap ring, for example, that retains the bearing 515A. The cooling fins 110A can be formed on the exterior of the housing member 102A, while the cooling fins 110D can be formed on the interior of the housing member 102A. A through bore 2306 and a number of guide bores 2308 can be provided to cooperate with and/or receive the manual neutral knob assembly 108. A lubricant port 2310 can be formed on the exterior of the upper housing member 102A and is configured to receive a hydraulic fitting to supply lubricant to the IVT 100. A piloting shoulder 2312 and a number of threaded bores 2314 can be provided to receive the housing cap 410 (see, for example, FIG. 4).

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:
1. A transmission comprising:
a plurality of power roller assemblies arranged angularly about a longitudinal axis of the transmission, the power roller assemblies configured to tilt during operation;
a first traction ring in contact with the power rollers;
a second traction ring in contact with the power rollers; and
an idler in contact with the power rollers, the idler adapted to translate with respect to the longitudinal axis;
a shift rod sleeve operably coupled to the idler, the shift rod sleeve configured to rotate with the idler;

a shift rod driver arranged along the longitudinal axis, the shift rod driver operably coupled to the shift rod sleeve;

an output feedback rod coupled to the shift rod driver; and an output engagement mechanism operably coupled to the output feedback rod, wherein the output engagement mechanism is configured to rotate with the second traction ring.

2. The transmission of claim 1, further comprising a control interface housing operably coupled to the shift rod driver.

3. The transmission of claim 1, wherein the output engagement mechanism is configured to selectively couple to the output feedback rod during operation of the transmission.

4. The transmission of claim 1, wherein a speed of rotation of the output engagement mechanism facilitates an axial translation of the shift rod sleeve.

5. A control system for an infinitely variable transmission (IVT), the control system comprising:

a shift rod driver;

an output feedback rod coupled to the shift rod driver;

a control interface housing operably coupled to the shift rod driver, the control interface housing configured to translate axially;

an output member configured to be selectively coupled to the output feedback rod; and an output engagement mechanism having a plurality of pins, the output engagement mechanism coupled to the output member, the output engagement mechanism selectively coupled to the output feedback rod.

6. The control system of claim 5, further comprising an adjustment member coupled to the control interface housing, the adjustment member configured to cooperate with the shift rod driver.

7. The control system of claim 5, wherein the output engagement mechanism comprises a spring coupled to each of the pins.

* * * * *